United States Patent
Verdie et al.

(10) Patent No.: US 12,424,029 B2
(45) Date of Patent: Sep. 23, 2025

(54) DEVICES AND METHODS FOR SINGLE OR MULTI-USER GESTURE DETECTION USING COMPUTER VISION

(71) Applicants: Yannick Verdie, Toronto (CA); Zi Hao Yang, Richmond Hill (CA); Deepak Sridhar, Richmond Hill (CA); Juwei Lu, North York (CA)

(72) Inventors: Yannick Verdie, Toronto (CA); Zi Hao Yang, Richmond Hill (CA); Deepak Sridhar, Richmond Hill (CA); Juwei Lu, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 618 days.

(21) Appl. No.: 17/846,770

(22) Filed: Jun. 22, 2022

(65) Prior Publication Data
US 2023/0419733 A1 Dec. 28, 2023

(51) Int. Cl.
G06V 40/20 (2022.01)
G06T 7/246 (2017.01)
G06T 7/73 (2017.01)
G06V 20/64 (2022.01)
G06V 30/14 (2022.01)

(52) U.S. Cl.
CPC .............. G06V 40/28 (2022.01); G06T 7/246 (2017.01); G06T 7/73 (2017.01); G06V 20/64 (2022.01); G06V 30/1456 (2022.01); G06T 2207/30196 (2013.01)

(58) Field of Classification Search
USPC .......................................... 382/103
See application file for complete search history.

(56) References Cited

U.S. PATENT DOCUMENTS

| | | | |
|---|---|---|---|
| 8,064,704 B2 | 11/2011 | Kim et al. | |
| 9,990,050 B2 | 6/2018 | Zhang et al. | |
| 11,556,183 B1* | 1/2023 | Li | G06V 40/107 |
| 2009/0103780 A1 | 4/2009 | Nishihara et al. | |
| 2011/0102570 A1 | 5/2011 | Wilf et al. | |
| 2021/0279453 A1* | 9/2021 | Luqman | G06V 10/764 |
| 2023/0333660 A1* | 10/2023 | Ali | G06F 3/017 |
| 2023/0350495 A1* | 11/2023 | Vaday | G06F 3/017 |

FOREIGN PATENT DOCUMENTS

JP 4869135 B2 8/2012

\* cited by examiner

*Primary Examiner* — Gabriel I Garcia

(57) ABSTRACT

Methods and devices are described for computer vision-based gesture detection. From a frame of image data, extracted locations of keypoints of a detected hand are obtained. The extracted locations are normalized to obtain normalized features. The normalized features are processed using a trained decision tree ensemble to generate a probability of a valid gesture for the detected hand. The generated probability is compared with a defined decision threshold to generate a binary classification to classify the detected hand as a valid gesture or invalid gesture.

20 Claims, 13 Drawing Sheets

DEVICES AND METHODS FOR SINGLE OR MULTI-USER GESTURE DETECTION USING COMPUTER VISION

FIELD

The present disclosure relates to devices and methods for computer vision-based detection and recognition of hand gestures, including single user gestures as well as multi-user gestures.

BACKGROUND

Touch gestures are commonly used for interaction with digital content (e.g., digital text) that is displayed on a touchscreen of a device (e.g., smartphone, tablet, laptop, etc.). Such touch-based technologies are limited in that a touchscreen is required and a user can only interact with digitally displayed content.

Technology that enables user interaction (e.g., selection) of non-digital visual content (e.g., text of a physical book) using hand gestures have been developed. Such technologies typically use hand tracking algorithms and computer vision-based detection of hand gestures. However, existing techniques for machine vision-based detection of hand gestures are typically limited in the type of gestures that are recognized, and results in less intuitive user interactions and a poorer user experience compared to touch-based interactions.

Further, existing computer vision-based detection of hand gestures may suffer from a higher rate of false positives (i.e., incorrectly detecting an invalid gesture as a valid gesture) compared to touch-based gesture detection. While various neural networks have been developed for computer vision-based gesture detection, such neural networks are typically complex and require many neural network layers to achieve a desired level of accuracy in gesture detection. These deep neural networks may require a large amount of computations to execute as well as a large amount of processing and memory resources. This limits the use of such technologies in many practical applications, for example in consumer devices (e.g., mobile devices and smart appliances) that may have limited resources (e.g., limited memory resources, limited processing power, limited battery power, etc.).

Accordingly, it would be useful to provide computer vision-based methods and devices for detection and recognition of hand gestures that may support more intuitive user interactions and provide higher accuracy.

SUMMARY

The present disclosure describes devices and methods for computer vision-based gesture detection and hand tracking. Examples are described in which hand gestures are used for selection of non-digital content, such as selection of non-digital text and/or images, however this is not intended to be limiting. The disclosed examples may be used in augmented reality (AR) applications, virtual reality (VR) applications, and point-to-read applications, among others.

The present disclosure describes techniques that may help to reduce the number of false positive hand gesture detections. In particular, a decision tree-based approach is used to classify whether a detected hand is a valid gesture (e.g., a pointing gesture), rather than relying on deep neural networks. This provides the technical advantage that incorrect detection of hand gestures may be reduced without significantly increasing the computational cost.

Examples are described that enable computer vision-based detection of hand gestures by a single user, as well as hand gestures by multiple users. This provides the technical advantage that a greater variety of user interactions with a computing device is supported (e.g., multi-user cooperative interactions, teacher-student interactions, etc.).

In some examples, computer vision-based detection of hand gestures may take into account the orientation of the user, rather than assuming that the user is at a default orientation with respect to the camera. This provides the technical advantage that more intuitive user interactions are supported.

Examples are also described that enable the use of depth data to assist in determining whether a hand gesture should be detected as a touch or selection input. This provides the technical advantage that the number of false positives (e.g., erroneously detecting a hovering finger as touching the non-digital content) may be reduced.

In an example aspect, the present disclosure describes a device including at least one processing unit coupled to a memory storing computer-executable instructions thereon. The instructions, when executed by the at least one processing unit, cause the device to: obtain extracted locations of keypoints of a detected hand in a frame of image data; normalize the extracted locations to obtain normalized features; process the normalized features using a trained decision tree ensemble to generate a probability of a valid gesture for the detected hand; and compare the generated probability with a defined decision threshold to generate a binary classification to classify the detected hand as a valid gesture or invalid gesture.

In an example of the preceding example aspect of the device, the extracted locations may be extracted locations of five fingers of the detected hand.

In an example of any of the preceding example aspects of the device, the instructions may cause the device to normalize the extracted locations by: fitting the extracted locations to an ellipse; determining a transformation to transform the ellipse to a unit circle; and applying the determined transformation to the extracted locations, to obtain the normalized features.

In an example of any of the preceding example aspects of the device, the trained decision tree ensemble may include a plurality of trained decision trees, each trained decision tree being trained to process a set of normalized features as input and generate as output a predicted binary classification score, and the probability generated by the trained decision tree ensemble may be an average of the binary classification scores generated by the plurality of trained decision trees.

In an example of any of the preceding example aspects of the device, the instructions may cause the device to perform the obtaining, normalizing, processing and comparing to classify two or more detected hands as each performing a valid gesture that is a pointing gesture. The instructions may further cause the device to: for a pair of detected hands assigned to a fingertip pair, obtain a detected location of a fingertip of each detected hand and a detected location of a wrist of at least one detected hand; compute a respective at least one hand direction for the at least one detected hand using a vector from the detected location of the wrist to the detected location of the fingertip; determine a user-specific orientation based on the at least one computed hand direction; and output an oriented selection region defined in the frame of image data, wherein the oriented selection region is defined using the user-specific orientation and the detected locations of the fingertips of the pair of detected hands.

In an example of the preceding example aspect of the device, a first hand direction may be computed for a first hand in the pair of detected hands and a second hand direction may be computed for a second hand in the pair of detected hands, and the user-specific orientation may be determined based on an average of the first and the second hand directions.

In an example of some of the preceding example aspects of the device, the oriented selection region may be defined as a selection rectangle that is aligned with the user-specific orientation and that has opposite corners defined by the detected locations of the fingertips of the pair of detected hands.

In an example of any of the preceding example aspects of the device, the instructions may further cause the device to: in response to generation of the binary classification to classify the detected hand as a valid gesture that is a pointing gesture, further classify whether the valid gesture is in a touching state or a hovering state by: synchronizing the frame of image data with a frame of depth data; extracting a patch of depth data in a region about a detected fingertip of the pointing gesture; computing a spread in depth values in the extracted patch of depth data; and comparing the computed spread with defined depth threshold to generate a touch state classification classifying the valid gesture as the touching state or the hovering state.

In an example of the preceding example aspect of the device, the frame of image data may be synchronized with the frame of depth data using a circular buffer, and the circular buffer may have a length equal to a known frame offset between received image data and received depth data.

In an example of any of the preceding example aspects of the device, there may be a plurality of detected hands in the frame of image data, and the obtaining, normalizing, processing and comparing may be performed to classify two or more of the detected hands as performing a valid gesture that is a pointing gesture. The instructions may further cause the device to: pair up at least two of the two or more detected hands as a fingertip pair; and define, using detected locations of fingertips of the fingertip pair, a selection region in the frame of image data.

In an example of the preceding example aspect of the device, there may be at least four detected hands performing a valid gesture that is a pointing gesture, there may be at least two fingertip pairs, and a respective selection region may be defined for each of the at least two fingertip pairs.

In an example of any of the preceding example aspects of the device, the instructions may further cause the device to: in response to generation of the binary classification to classify the detected hand as a valid gesture, define a selection region in the frame of image data based on the valid gesture; and perform text recognition on the defined selection region in the frame of image data.

In another example aspect, the present disclosure describes a method including: obtaining extracted locations of keypoints of a detected hand in a frame of image data; normalizing the extracted locations to obtain normalized features; processing the normalized features using a trained decision tree ensemble to generate a probability of a valid gesture for the detected hand; and comparing the generated probability with a defined decision threshold to generate a binary classification to classify the detected hand as a valid gesture or invalid gesture.

In an example of the preceding example aspect of the method, normalizing the extracted locations may include: fitting the extracted locations to an ellipse; determining a transformation to transform the ellipse to a unit circle; and applying the determined transformation to the extracted locations, to obtain the normalized features.

In an example of any of the preceding example aspects of the method, the trained decision tree ensemble may include a plurality of trained decision trees, each trained decision tree being trained to process a set of normalized features as input and generate as output a predicted binary classification score, and the probability generated by the trained decision tree ensemble may be an average of the binary classification scores generated by the plurality of trained decision trees.

In an example of any of the preceding example aspects of the method, the method may further include performing the obtaining, normalizing, processing and comparing to classify two or more detected hands as each performing a valid gesture that is a pointing gesture. The method may further include: for a pair of detected hands assigned to a fingertip pair, obtaining a detected location of a fingertip of each detected hand and a detected location of a wrist of at least one detected hand; computing a respective at least one hand direction for the at least one detected hand using a vector from the detected location of the wrist to the detected location of the fingertip; determining a user-specific orientation based on the at least one computed hand direction; and outputting an oriented selection region defined in the frame of image data, wherein the oriented selection region is defined using the user-specific orientation and the detected locations of the fingertips of the pair of detected hands.

In an example of the preceding example aspect of the method, a first hand direction may be computed for a first hand in the pair of detected hands and a second hand direction may be computed for a second hand in the pair of detected hands, and the user-specific orientation may be determined based on an average of the first and the second hand directions.

In an example of some of the preceding example aspects of the method, the oriented selection region may be defined as a selection rectangle that is aligned with the user-specific orientation and that has opposite corners defined by the detected locations of the fingertips of the pair of detected hands.

In an example of any of the preceding example aspects of the method, the method may further include: in response to generation of the binary classification to classify the detected hand as a valid gesture that is a pointing gesture, further classifying whether the valid gesture is in a touching state or a hovering state by: synchronizing the frame of image data with a frame of depth data; extracting a patch of depth data in a region about a detected fingertip of the pointing gesture; computing a spread in depth values in the extracted patch of depth data; and comparing the computed spread with defined depth threshold to generate a touch state classification classifying the valid gesture as the touching state or the hovering state.

In another example aspect, the present disclosure describes a non-transitory computer readable medium having instructions encoded thereon. The instructions, when executed by at least one processing unit of a computing device, cause the computing device to: obtain extracted locations of keypoints of a detected hand in a frame of image data; normalize the extracted locations to obtain normalized features; process the normalized features using a trained decision tree ensemble to generate a probability of a valid gesture for the detected hand; and compare the generated probability with a defined decision threshold to generate a binary classification to classify the detected hand as a valid gesture or invalid gesture.

In various example aspects of the computer readable medium, the instructions may further cause the computing device to perform any of the examples described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1:
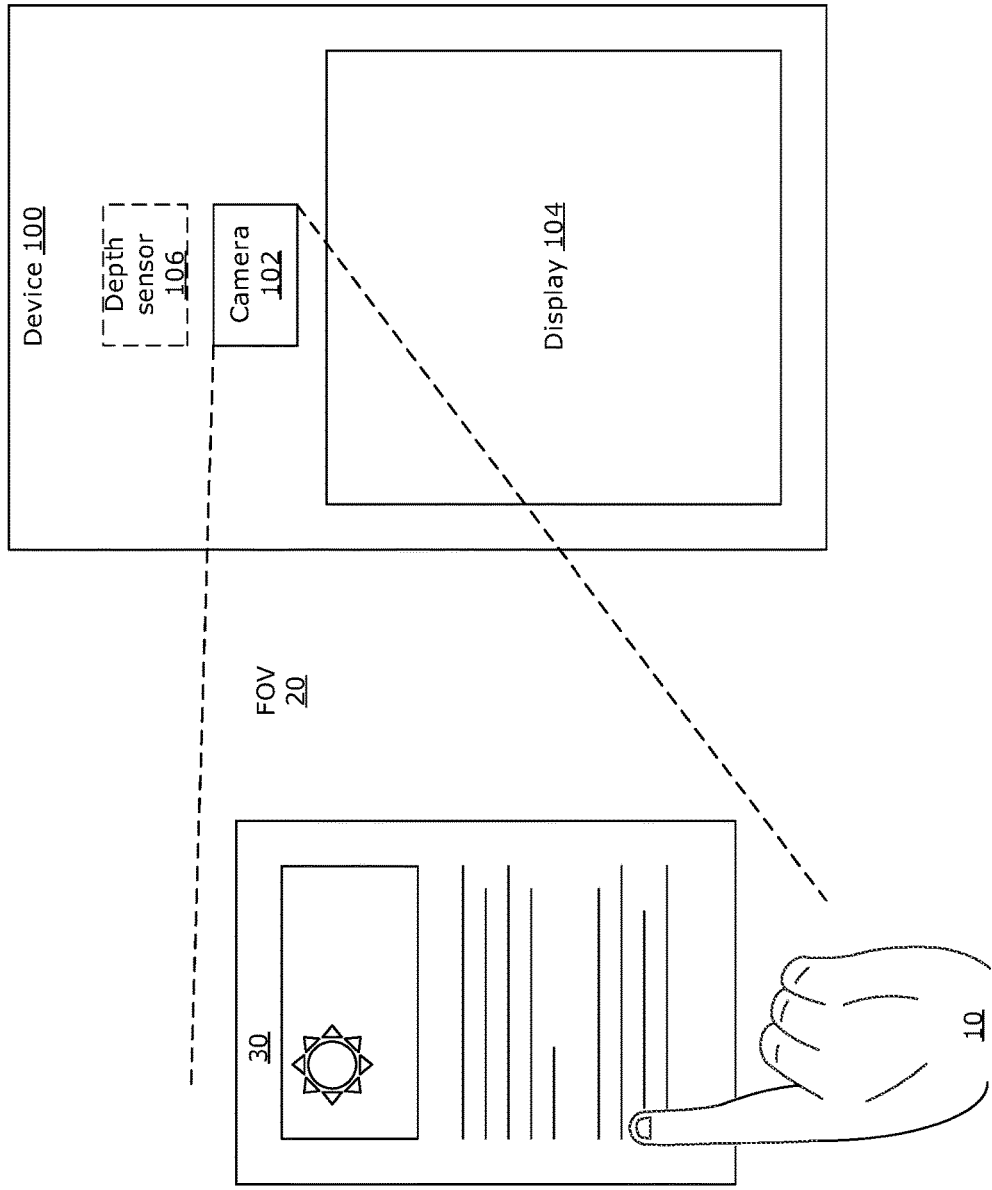
FIG. 1 is a simplified block diagram illustrating a user interacting with an example computer vision-capable device, in accordance with examples of the present disclosure.

In various examples, the present disclosure describes devices and methods for single user or multi-user gesture detection using computer vision. Examples of the present disclosure may be implemented in various computer vision-capable computing devices, including a mobile communication device (e.g., smartphone), a tablet device, a laptop device, a desktop device, a head mounted display (HMD) device, smart glasses, a wearable device, a smart lighting device, a smart speaker device, a smart appliance or a dedicated reader device, among other possibilities. Examples of the present disclosure may also be implemented in devices that have touch detection capabilities as well as computer vision capabilities.

The methods and devices described herein may be used to enable gesture detection for various applications, including gesture-based selection of any visual content, and in particular any non-digital visual content. In the present disclosure, visual content may refer to any content that can be detected and recognized using computer vision algorithms, including any content that can be viewed by human vision. In the context of the present disclosure, visual content may include electronic content that is displayed (e.g., displayed on a screen to be viewed by a human) or projected (e.g., a holographic projection), as well as non-digital content (also referred to a non-electronic content). Non-digital content may refer to content that is not displayed electronically, including text and/or image content in any physical medium (e.g., a physical page, physical book, physical sign, etc.), among other possibilities. The methods and devices herein may enable gesture detection to support user interactions in augmented reality (AR) or virtual reality (VR) environments, as well as other applications.

Various techniques for computer vision-based gesture detection have been developed. An example of computer vision-based gesture detection has been described in PCT application no. PCT/CN2021/106778, entitled "A NOVEL POINT READER SYSTEM WITH HAND GESTURES", filed Jul. 16, 2021, incorporated herein by reference in its entirety. However, a challenge with some existing computer vision-based gesture detection systems is that they typically recognize only limited hand gestures, such as single hand pointing gestures or single user static pointing gestures. This limits the type of user interactions that can be supported, resulting in a less intuitive and less effective user interface, and limiting the possible applications.

Further, many existing computer vision-based gesture detection technologies typically require implementation of complex deep neural networks (DNNs), particularly for hand shape classification, with increasing numbers of neural network layers being relied upon to increase accuracy. However, the use of such complex DNNs means that such technology may not be practical to implement on devices having limited resources (e.g., mobile devices such as smartphones, tablet devices, laptop devices, desktop devices, HMD devices, smart glasses, wearable devices, smart light devices, smart speaker devices, smart appliances, reader devices, etc.).

The present disclosure describes devices and methods for computer vision-based detection of human hand gestures, including single user and multi-user hand gestures. Examples include detection of hand gestures that take into account the orientation of the user performing the gesture. The present disclosure also describes a method for improving accuracy in classification of hand gestures, without relying on DNNs. The present disclosure also describes methods that use depth data to help distinguish between touching and non-touching gestures.

To assist in understanding the present disclosure, an example computer vision-capable device is described. It should be understood that this is provided only as an example and is not intended to be limiting. Examples of the present disclosure may be implemented in other computer vision-capable devices, including wearable devices.

FIG. 1 shows an example of a single user interacting with a computer vision-capable device 100 (referred to hereinafter as device 100 for simplicity). In this simplified diagram, the device 100 includes a camera 102 that captures a field-of-view (FOV) 20. The camera 102 may be any optical sensor capable of capturing a video (comprising a plurality of frames) of the FOV 20 in real-time or near real-time. The captured FOV 20 includes a hand 10 of the user and a visual content 30. The visual content 30 may include textual content and/or image content, for example. As will be discussed further below, there may be more than one user with one or both hands in the FOV 20 (e.g., two users may each place one hand in the FOV 20; two users may each place both hands in the FOV 20; one user may place one hand and another user may place both hands in the FOV 20; etc.), and each user may use single-handed or two-handed gestures within the FOV 20.

The device 100 also includes a display 104 providing an output, such as an image of the currently captured FOV 20, a virtual overlay indicating a detected gesture (e.g., an overlay indicating a selection box as a result of a detected gesture), virtual objects that can be interacted with using hand gestures, etc. Although not shown in FIG. 1, the device 100 may include other output devices, such as a speaker to provide audio output (e.g., audio output of a selected text in the visual content 30). The device 100 may also include other sensors, such as an optional depth sensor 106 (e.g., an infrared depth camera, or time-of-flight sensor) to detect depth of objects in the FOV 20, as discussed further below.

Figure 2:
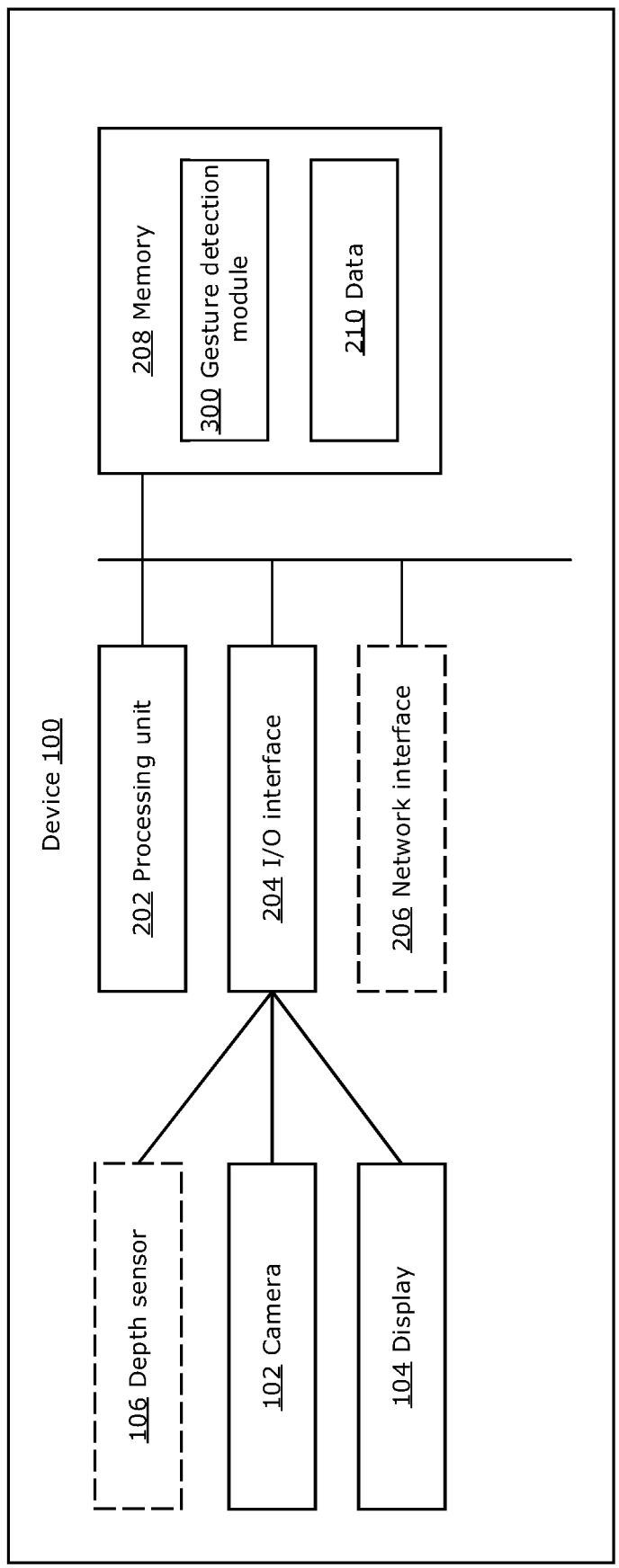
FIG. 2 is a block diagram illustrating some components of an example device, which may be used to implement examples of the present disclosure.

FIG. 2 is a block diagram showing some example components of the device 100. Although an example embodiment of the device 100 is shown and discussed below, other embodiments may be used to implement examples disclosed herein, which may include components different from those shown. Although FIG. 2 shows a single instance of each component, there may be multiple instances of each component shown.

The device 100 includes at least one processing unit 202, such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The device 100 also includes at least one input/output (I/O) interface 204, which interfaces with input devices such as the camera 102 and optional depth sensor 106, and output devices such as the display 104. The device 100 may include and/or may be coupled to other input devices (e.g., mechanical buttons, microphone, touchscreen, keyboard, infrared sensor, etc.) and other output devices (e.g., speaker, vibration unit, etc.). The camera 102 (or other input device) may have capabilities for capturing live video (i.e., in real-time or near real-time) as a sequence of video frames. The captured frames of video data may be buffered by the I/O interface 204 and provided to the processing unit 202 to be processed in real-time or near real-time (e.g., within 10 ms).

The device 100 may include an optional network interface 206 for wired or wireless communication with other computing systems and/or a network (e.g., an intranet, the Internet, a P2P network, a WAN and/or a LAN). The network interface 206 may include wired links (e.g., Ethernet cable) and/or wireless links (e.g., one or more antennas) for intra-network and/or inter-network communications. The network interface 206 may enable the device 100 to communicate with other computing systems (e.g., a cloud-based computing platform) to access services provided by the other computing systems (e.g., to access cloud-based translation services).

The device 100 includes at least one memory 208, which may include a volatile or non-volatile memory (e.g., a flash memory, a random access memory (RAM), and/or a read-only memory (ROM)). In some examples, the device 100 may also include an electronic storage unit (not shown), such as a solid state drive, a hard disk drive, a magnetic disk drive and/or an optical disk drive.

The non-transitory memory 208 may store instructions for execution by the processing unit 202, such as to carry out example embodiments described in the present disclosure. For example, the memory 208 may include instructions for executing a gesture detection module 300, discussed further below. The memory 208 may include other software instructions, such as for implementing an operating system and other applications/functions. The memory 208 may also include data 210, such as learned parameters for a group of gesture classification decision trees (also referred to as an ensemble) used to implement the gesture detection module 300. The memory 208 may also store temporary data (e.g., in a buffer or short-term cache), such as recognized text from a visual content within a current FOV 20 of the camera 102.

The device 100 may additionally or alternatively execute instructions from an external memory (e.g., an external drive in wired or wireless communication with the device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Figure 3:
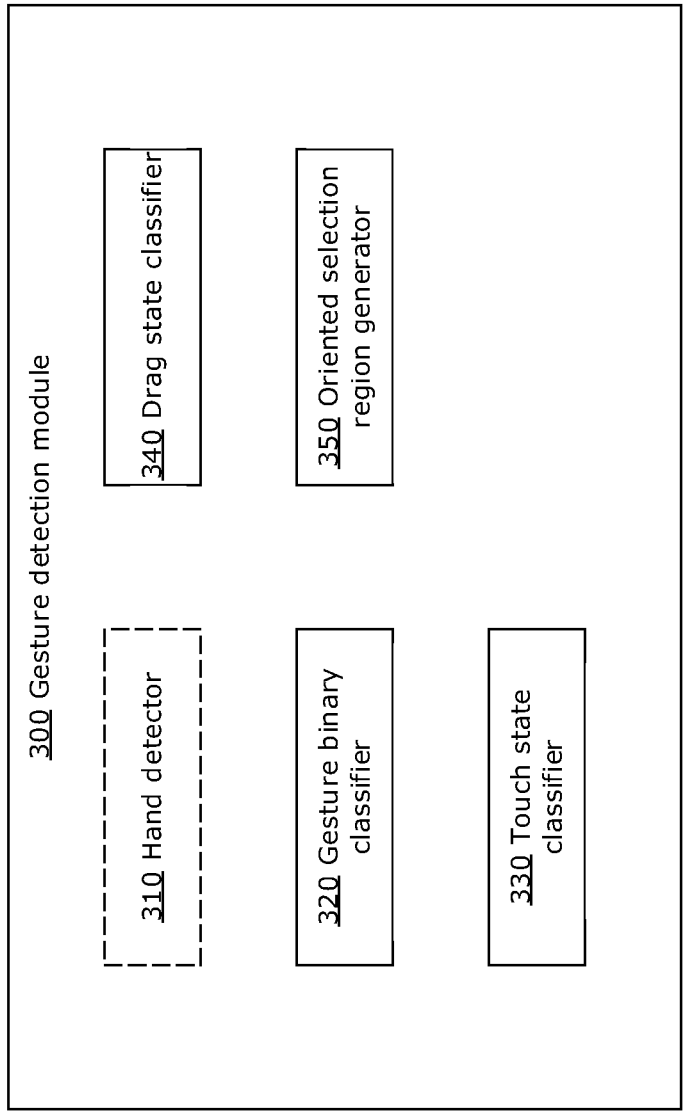
FIG. 3 is a block diagram illustrating example components of a gesture detection module, in accordance with examples of the present disclosure.

FIG. 3 is a block diagram illustrating example submodules of the gesture detection module 300. The gesture detection module 300 may be implemented by the device 100 (e.g., the processing unit 202 may execute instructions stored in the memory 208 to cause the device 100 to perform the operations of the gesture detection module 300).

The gesture detection module 300 may receive a video frame and may process the frame to output a predicted gesture class, a predicted touch state, a predicted drag state and/or a predicted selection boundary, for example. As described previously, a camera 102 (or other optical sensor) of the device 100 captures a live video of a FOV 20. Frames of the captured video are provided (in real-time or near real-time) as input (e.g., as 2D image data) to the gesture detection module 300. The gesture detection module 300 may process one frame at a time, or may process frames in batches.

In the example shown, the gesture detection module 300 includes an optional hand detector 310, a gesture binary classifier 320, a touch state classifier 330, a drag state classifier 340 and an oriented selection region generator 350. It should be understood that the submodules 310, 320, 330, 340, 350 are only exemplary and are not intended to be limiting. Certain submodules may be included or omitted from the gesture detection module 300, depending on the functionalities of the gesture detection module 300.

For example, the hand detector 310 may be omitted from the gesture detection module 300. Instead, hand detection may be performed by another module, external to the gesture detection module 300, and the gesture detection module 300 may be provided with frames in which one or more hands have already been detected (and bounding box(es) of the hand(s) have been defined), or may be provided with cropped images that have been cropped to show only the detected hand(s) (e.g., may be cropped to the bounding box(es) or cropped to a joint bounding box).

The present disclosure describes certain functionalities of the gesture detection module 300 being provided by certain submodules, however this is not intended to be limiting. Any functions described as being performed by any specific one of the submodules may be performed by any other one of the submodules or may be performed by the gesture detection module 300 without using any submodule. Further, the gesture detection module 300 may provide all of the functionalities described herein, may provide only some of the functionalities described herein, or may provide only one of the functionalities described herein. Thus, the implementation of the gesture detection module 300 may be different in other embodiments within the scope of the present disclosure.

A challenge in practical application of computer vision-based detection of hand gestures is that accurate classification of hand gestures can be difficult to achieve in real-life situations. For example, there may be poor lighting conditions or partial obstruction of a user's hand, which may result in worse performance of a machine learning-based hand gesture classification system that was trained on more ideal training data. To compensate for an expected decrease in performance in less-than-ideal real-life situations, a more complex (e.g., having more neural network layers) hand gesture classification system may be required. However, deep neural networks having many neural network layers typically require greater processing power to execute, which may not be suitable for many consumer devices that have relatively low computing power (e.g., IoT devices, smart appliances, etc.).

In some examples, the present disclosure describes an approach to help improve classification of hand gestures, without requiring the use of deep neural networks. In particular, the following discussion describes a method and system to improve accuracy in classifying a pointing hand gesture. However, it should be understood that the disclosed method and system may be adapted to classify other hand gestures (e.g., open hand gesture, pinch gesture, etc.).

Figure 4B:
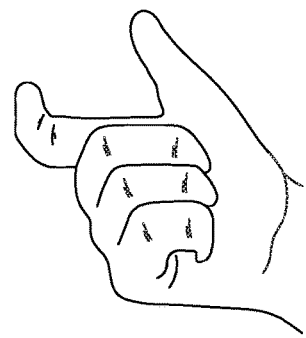
FIGS. 4A-4D illustrate some example gestures that may be detected and recognized by an example device, in accordance with examples of the present disclosure.
Figure 4D:
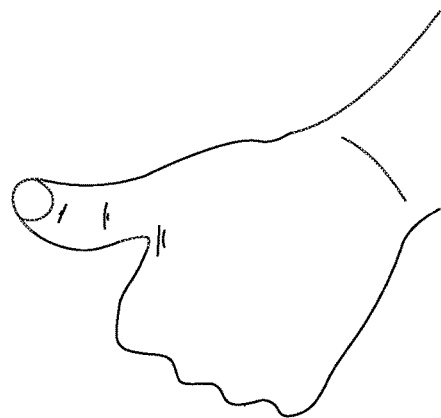
Figure 4A:
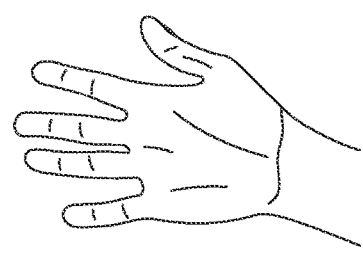
Figure 4C:
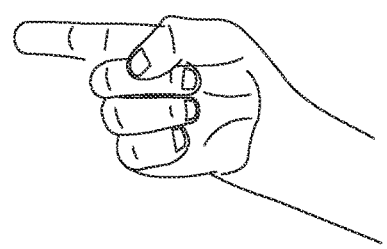

FIGS. 4A-4D illustrate examples of hand gestures that a user may perform to interact with the device 100. FIG. 4A illustrates an example of an "open hand" gesture. FIG. 4B illustrates an example of a "pinch" gesture. FIG. 4C illustrates an example of a "point" gesture. FIG. 4D illustrates an example of a "thumbs up" gesture.

In some examples, only the point gesture (e.g., as shown in FIG. 4C) may be recognized as a valid gesture for certain interactions with the device 100. For example, the gesture detection module 300 may, using the gesture binary classifier 320, perform a binary classification between a point gesture (considered a valid gesture) and all other hand gestures (considered invalid gestures).

Figure 5:
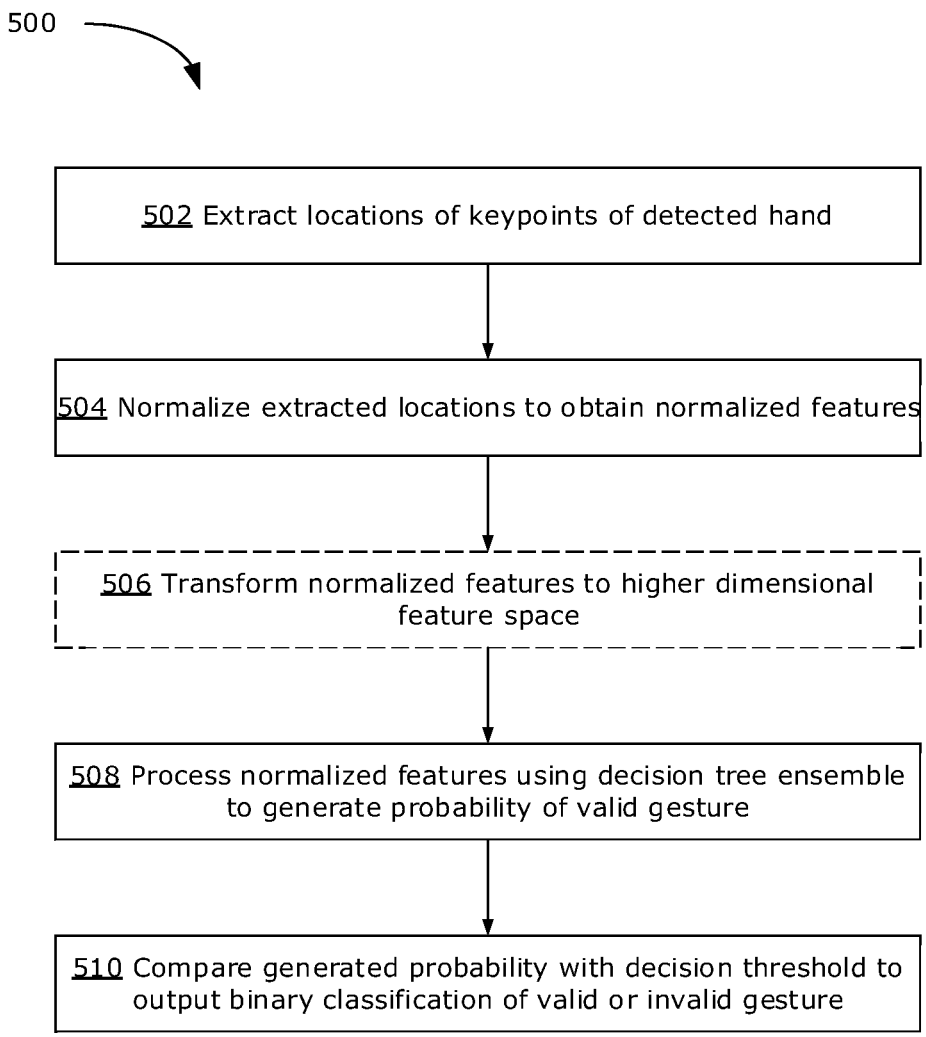
FIG. 5 is a flowchart of an example method for performing binary classification of a hand gesture using decision trees, in accordance with examples of the present disclosure.

FIG. 5 is a flowchart illustrating an example method 500 for binary classification of a hand gesture. The method 500 may be implemented by the device 100 (e.g., by the processing unit 202 executing instructions stored in the memory 208). The method 500 may be performed using the gesture binary classifier 320 of the gesture detection module 300, for example.

The method 500 may be performed on an image that is received by the gesture detection module 300 and that may have been processed by a submodule of the gesture detection module 300. The image may be a video frame that has been processed (e.g., by the hand detector 310 or other module external to the gesture detection module 300) to detect a hand (and corresponding bounding box) or that has been cropped to show a detected hand, for example.

At 502, the locations of keypoints of a detected hand are extracted from an image (e.g., a video frame, or a cropped image). The keypoints and their locations may be extracted using any suitable keypoint detection algorithm (e.g., using a trained hand keypoint detection model). In an example, keypoints may be extracted for each of the five fingers of a hand, and the locations of the keypoints in 2D (e.g., with respect to the coordinate system of the image) may be extracted. The result is a set of five (x, y) coordinates, each coordinate corresponding to the location of a respective extracted keypoint.

At 504, the extracted locations are normalized to obtain normalized features. This normalization may be performed to enable better generalization of the binary classification to various possible hand sizes, hand orientations, etc.

An example of the normalization process is described with reference to FIG. 6.

Figure 6:
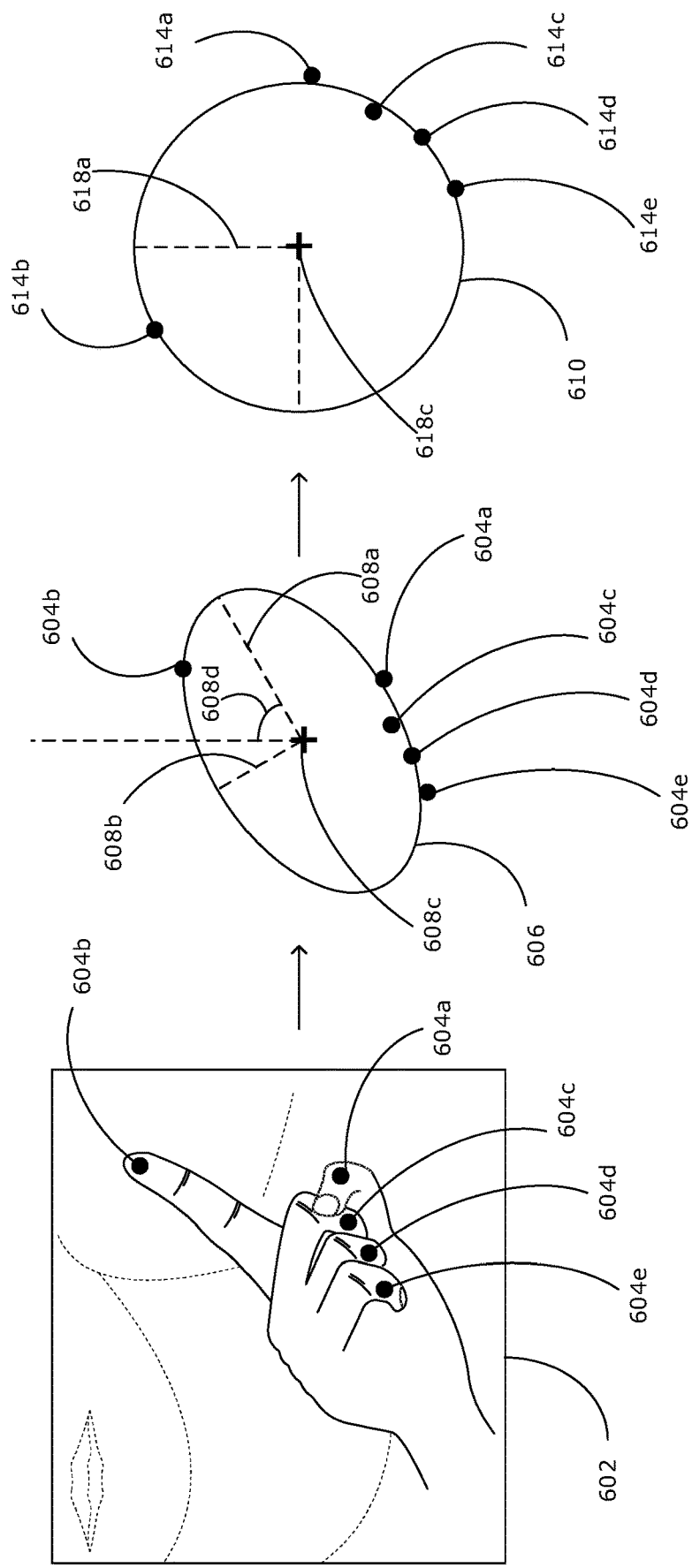
FIG. 6 illustrates an example of transforming extracted locations to normalized features, which may be used in the method of FIG. 5, in accordance with examples of the present disclosure.

FIG. 6 illustrates an example image 602 containing a detected hand. The image 602 has been processed to detect five keypoints (corresponding to the five fingers of the hand). The five extracted locations 604a-604e of the keypoints are indicated in FIG. 6 using black dots. Each extracted location 604a-604e has a corresponding 2D coordinate (e.g., (x, y) coordinates with respect to the coordinate system of the image 602). The extracted locations 604a-604e are normalized by first fitting the extracted locations 604a-604e to an ellipse, then applying to the coordinates of the locations 604a-604e a transformation (or mapping) that would cause the fitted ellipse to be transformed to a unit circle.

To normalize the extracted locations 604a-604e, a 2D ellipse 606 is fitted to the extracted locations 604a-604e. Any suitable ellipse fitting algorithm may be used to compute the ellipse 606 that fits the locations 604a-604e, such as a least squares fitting algorithm. Geometric properties of the fitted ellipse 606 are determined, namely the major axis 608a, the minor axis 608b, the location of the center 608c and rotation angle 608d (e.g., relative to a vertical axis defined in the coordinate system of the image 602). Using these geometric properties 608a-608d, the extracted locations 604a-604e may be normalized by subtracting the location of the center 608c from the coordinates of each location 604a-604e, rotating the coordinates of each location 604a-604e by an amount that is negative to the rotation angle 608d (i.e., by an amount such that the major axis 608a of the ellipse 606 would be parallel to the vertical axis), and normalize the coordinates of each location 604a-604e by the lengths of the minor axis 608b and the major axis 608a for the x and y coordinate, respectively. The result of this normalization is to effectively map the extracted locations 604a-604e to normalized features 614a-614e having coordinates that fit a unit circle 610 centered at the origin 618c, with a radius 618a of length 1 and having no tilt. It should be noted that this mapping, from the extracted locations 604a-604e to the normalized features 614a-614e corresponds to the transformation (or mapping) from the ellipse 606 to the unit circle 610 and is invariant to translation, scale and rotation.

By normalizing the extracted locations 604a-604e in this manner, a set of normalized features 614a-614e is obtained, which may be more accurately processed using lower-complexity machine learning methods, such as using decision trees. Reference is again made to FIG. 5.

Optionally, at 506, the normalized features may be transformed into a higher dimensional feature space. Transformation of the normalized features to a higher dimensional feature space may be useful because there may be greater separation between classes in the higher dimensional feature space (and hence greater likelihood of an accurate classification being performed). A common technique for transforming a feature vector (e.g., a 2D normalized coordinate is a 2D feature vector) to a higher dimensional feature space is to apply a kernel to the feature vector. Such a technique may be referred to as a kernel trick.

For example, a kernel trick to transform a 2D feature vector to a higher dimensional polynomial feature space of degree two is:

$$k(x,y)=(x,y,xy,x^2,y^2)$$

where k is the kernel function that is applied to the 2D feature vector (x, y) to transform to the polynomial feature vector (x, y, xy, $x^2$, $y^2$). It should be understood that this is only an example and other techniques for transforming the normalized features to a higher dimensional feature space, with or without using the kernel trick, may be used.

At 508, the normalized features (optionally in a higher dimensional feature space) are processed using a decision tree ensemble to generate a probability of a valid gesture.

For example, an ensemble of 100 (or other large number) decision trees may be trained using a labeled training dataset. The training dataset may be a set of hand images, where each image has been annotated with keypoints corresponding to the fingers of a detected hand and with a label corresponding to a gesture classification. The gesture classification may be binary (e.g., valid gesture for a pointing gesture or invalid gesture for all other gestures). Any suitable gradient descent optimization algorithm may be used to train the decision trees, such as extreme gradient boosting (XGBoost) using a differentiable loss function. Each decision tree in the ensemble processes the normalized features and outputs a predicted binary classification, which may be represented by a numerical score (e.g., a score of 1 for a valid gesture, a score of 0 for an invalid gesture). The scores from all the decision trees in the ensemble may be averaged to obtain a probability generated by the decision tree ensemble.

At 510, the generated probability is compared with a decision threshold to output a binary classification of a valid or invalid gesture. For example, depending on the numerical score outputted by the decision trees, the probability generated by the decision tree ensemble may be between 0.0 (i.e., 0% likelihood of being a valid gesture) and 1.0 (i.e., 100% likelihood of being a valid gesture). A decision threshold may be set empirically. For example, a decision threshold of 0.5 may be set, where a generated probability equal to or above 0.5 results in output of a valid gesture classification, and a generated probability below 0.5 results in output of an invalid gesture classification.

It may be noted that normalizing the features (and optionally transforming the features into a higher dimensional feature space) and using a trained decision tree ensemble to output a predicted probability in this manner may enable a hand gesture to be classified as a valid gesture (e.g., pointing gesture) or invalid gesture (e.g., any other gesture) with sufficient accuracy, and without the added complexity of a deep neural network. The use of sparse decision trees may require little computational cost, compared to conventional convolutional neural network-based gesture classifiers. Thus, the method 500 may be suitable for practical implementation on devices having limited processing power and/or memory space, such as smart appliances, IoT devices, etc.

The method 500 enables accurate and quick classification of hand gestures, such as a pointing gesture that is commonly used in text reading or content selection applications. The method 500 may help to reduce instances of false positive gesture recognition that often cause undesirable premature fingertip activation or poor fingertip tracking. Further, the method 500 may be used in addition to existing gesture classification techniques (e.g., using convolutional neural networks), to help refine the initial classification output without introducing significant computational cost.

It should be understood that the method 500 is not limited to implementation using the gesture detection module 300 and is not limited to being implemented together with the functionality of any of the submodules shown in FIG. 3. For example, the method 500 may be implemented (e.g., using a standalone gesture binary classifier 320), without or without another gesture classification technique, in any device that uses computer vision to perform gesture recognition.

The binary classification may be outputted to be further processed by other modules. For example, the binary classification may be outputted by the gesture binary classifier 320 and the gesture detection module 300 may use the binary classification to determine whether the gesture should be further processed. For example, if the gesture binary classifier 320 outputs an invalid gesture classification, then the gesture may not require processing. On the other hand, if the gesture binary classifier 320 outputs a valid gesture classification (e.g., indicating a pointing gesture), then the gesture detection module 300 may use the touch state classifier 330 to further process the gesture to determine if the pointing finger is touching a surface.

A challenge with computer vision-based techniques to detect a user's touch gesture is that it is often difficult to discriminate between a pointing gesture where the fingertip is touching a surface (which can be recognized as activation or start of a recognized gesture) and a pointing gesture where the fingertip is hovering over (but not touching) the surface. In many devices, the camera may only be able to capture the FOV from a single vantage point, such as a top-down vantage point, where a pointing gesture that is touching the surface may appear very similar to a pointing gesture that is hovering over the surface. Some existing solutions may address this challenge by requiring a user's hand to be stationary for a certain time duration (e.g., 1 s) to be recognized as a touch activation (similar to a click input). However, this limits the user's ease of interaction and forces the user to slow down their gestures in a way that may be unnatural. Further, a user may, while still hovering a finger over the surface, pause movement of their hand to decide on a location to touch, and this pause while still hovering may be incorrectly detected as a touch activation.

In some examples, the present disclosure describes an approach to help improve discrimination between a fingertip touching a surface and a fingertip that is hovering over a surface. The following discussion describes a method and system that uses depth data together with image (e.g., RGB) data. In particular, because existing devices may have a camera separate from a depth sensor (and these two input devices may not be calibrated or synchronized to each other), a technique is described to account for any offset between the depth data captured by the depth sensor and the image data captured by the camera.

Figure 7:
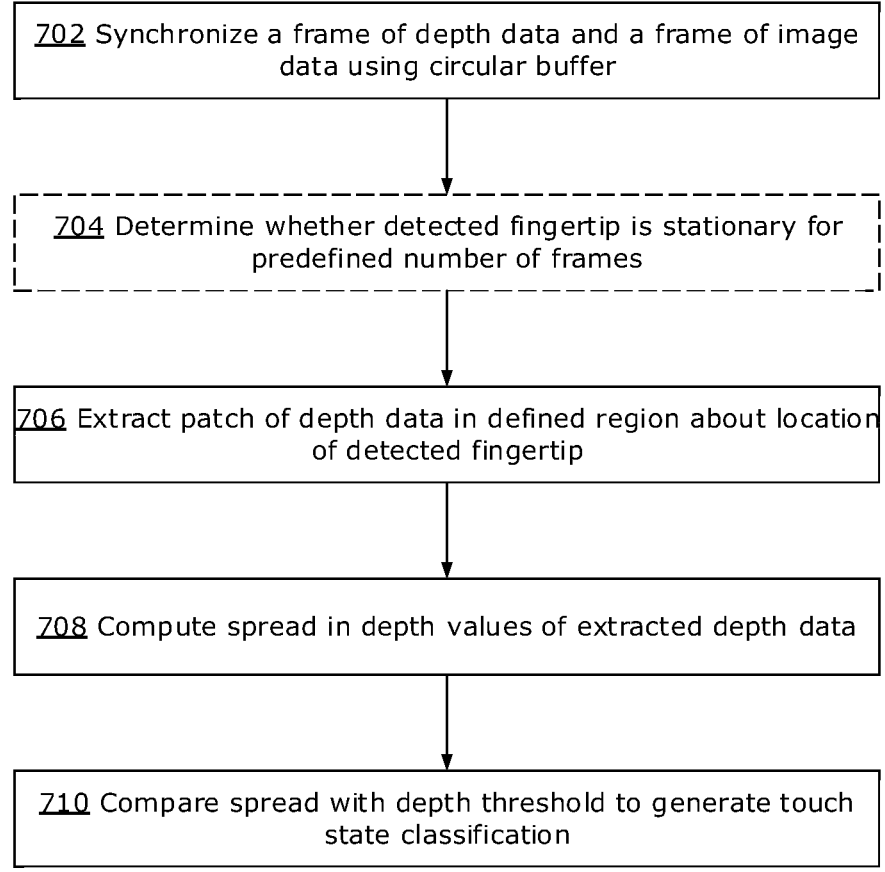
FIG. 7 is a flowchart of an example method for classifying the touch state of a detected fingertip, in accordance with examples of the present disclosure.

FIG. 7 is a flowchart illustrating an example method 700 for classifying the touch state of a detected fingertip. The touch state of a detected fingertip may be classified as touching or hovering. The method 700 may be implemented by the device 100 (e.g., by the processing unit 202 executing instructions stored in the memory 208). The method 700 may be performed using the touch state classifier 330 of the gesture detection module 300, for example.

In the method 700, frames of depth data and frames of image data may be received at the gesture detection module 300 in real-time or near real-time from a depth sensor and an image sensor (e.g., the depth sensor 106 and camera 102 of the device 100). The image data may be a video frame that has been processed (e.g., by the hand detector 310 or other module external to the gesture detection module 300) to detect a hand (and corresponding bounding box) or that has been cropped to show a detected hand, for example. In some examples, the method 700 may be performed after a gesture in the image has been classified as a valid pointing gesture (e.g., using the method 500).

In general, there may be a frame offset between the depth data and the image data, for example due to differences in capture rate and/or differences in preprocessing time. For example, if frames of depth data and frames of image data are both being received at the gesture detection module 300 as soon as they are available (e.g., as soon as they are captured and processed through an I/O interface), a frame of depth data captured at a given time may arrive at the gesture detection module 300 earlier than a frame of image data captured at the same given time. Thus, a frame of depth data and a frame of image data that are received by the gesture detection module 300 at the same time cannot be assumed to be data captured at the same time. For example, a frame of image data captured at a given time may arrive at the gesture detection module 300 seven frames after a frame of depth data captured at the same given time, meaning there is a frame offset of seven frames between the image data and the depth data. Typically, the frame offset for a given device can be determined (e.g., during factory calibration) and is typically fixed.

At 702, a frame of depth data and a frame of image data are synchronized with each other using a circular buffer. Specifically frames of the earlier-arriving one of the depth data or the image data are accumulated in the circular buffer until a corresponding frame of the later-arriving one of the depth data or image data is received. Then the stored frame of the earlier-arriving data that corresponds to capture time of the received frame of the later-arriving data can be removed from the circular buffer and processed together with the frame of later-arriving data. A circular buffer is a data structure having a set length in which data is stored and removed in a first in, first out basis, and in which when the buffer is full the oldest data in the buffer is overwritten with new data.

The circular buffer may be defined to have a length equal to the number of frames in the known frame offset. Based on the known frame offset, it is known whether the depth data arrives later or the image data arrives later (and also known the number of frames by which the depth or image data is late). The frames of the earlier-arriving data are accumulated in a circular buffer, until a frame of the later-arriving is received that corresponds to the first frame in the buffer.

For example, if the image data is known to arrive seven frames later than the depth data, then the depth data may be accumulated in the circular buffer having a length of seven. Then, when a frame of image data is received, the frame of image data corresponds to the oldest frame of depth data stored in the circular buffer. The oldest stored frame of depth data is removed from the circular buffer and is thus synchronized with the received frame of image data. In this way, a frame of depth data and a frame of image data are synchronized to each other.

In some examples, a pointing fingertip may already have been detected in the frame of image data (also referred to simply as the image) and the location of the fingertip may already have been determined, prior to the method 700. In other examples, fingertip detection may be performed using any suitable fingertip detection algorithm on the synchronized image.

Optionally, at 704, it is determined whether a detected fingertip in the image data has been stationary for a predefined number of frames (e.g., corresponding to a time duration of 1 s). Optional step 704 may be performed if depth data is being used to verify whether a fingertip that has been determined to be a touch gesture, based on the fingertip being stationary, actually is touching a surface. In other examples, the depth data may be used to determine a touch gesture without requiring the fingertip to be stationary, and step 704 may be omitted.

Optional step 704 may be performed, for example, by tracking the location of a detected fingertip over a predefined number of frames of image data (e.g., 10 frames). If the tracked location is approximately unchanged (within a defined margin of error) over the predefined number of frames, the fingertip may be considered to be stationary and the detected fingertip may be provisionally classified as being in the touching state. The method 700 may continue to step 706. If the tracked location is substantially changed (e.g., the tracked location moves more than the defined margin of error) over the predefined number of frames, the fingertip may be considered to be moving, the detected fingertip may be classified as being in the hovering state and the method 700 may end by outputting the hovering state classification.

At 706, a patch of depth data is extracted from the frame of depth data, corresponding to a defined region about the location of the detected fingertip. For example, the defined region may correspond to a grid of data (e.g., a 21×21 grid of data) that is centered at a location corresponding to the location of the detected fingertip. Although a square patch of depth data may be most easily extracted (since each frame of depth data may be in matrix format), in other examples a circular patch or other regular or irregular patch of depth data may be extracted.

It should be noted that, since the location of the detected fingertip may be detected in (x, y) coordinates based on the coordinate system of the image, and the depth data may using a different coordinate system (e.g., having a different origin, having a different scale, etc.), it may be necessary to map the location of the detected fingertip to the coordinate system of the depth data. The transformation required to map coordinates in the image coordinate system to the depth data coordinate system (and vice versa) may be predetermined (e.g., during a prior calibration). This transformation may be applied to the location of the detected fingertip to find the corresponding location in the depth data and to extract the defined region of depth data about the location of the detected fingertip.

At 708, a spread in the depth values of the extracted depth data is computed. The spread in depth values may be computed using any suitable statistical methods, for example by computing the difference between the depth value at 95 percentile and the depth value at 5 percentile. More simplistically, the spread may be computed by computing the difference between the maximum depth value and the minimum depth value in the extracted depth data. Using the depth values at 95 percentile and 5 percentile, instead of the maximum and minimum depth values, may avoid the possibility of extreme outliers due to noise being erroneously used to compute the spread.

At 710, the computed spread is compared with a defined depth threshold to generate a touch state classification. If the computed spread (e.g., the computed difference between 95 percentile and 5 percentile depth values) is greater than or equal to the depth threshold, then the detected fingertip is considered to be in the hovering state and a hovering state classification is generated and outputted. If a touching state was provisionally determined at optional step 704, this is corrected so that a hovering state classification is generated.

If the computer difference is less than the depth threshold, then the detected fingertip is considered to be in the touching state and a touching state classification is generated and outputted.

When a touching state classification is outputted, the gesture detection module 300 may determine this to be a touch activation that corresponds to a touch or selection input (e.g., similar to a click input). The method 700 enables more accurate detection of a touch activation, compared to some existing computer vision-based techniques that use only image data to determine a touch gesture. The method 700 may help to reduce instances of false positive touch activations that can result in a hovering gesture being erroneously interpreted as selection input. Further, the method 700 may enable user interactions to be simplified, for example it may not be necessary for a finger to be held stationary (or may only need to be held stationary for a shorter time duration) to be detected as a touch activation.

It should be understood that the method 700 is not limited to implementation using the gesture detection module 300 and is not limited to being implemented together with the functionality of any of the submodules shown in FIG. 3. For example, the method 700 may be implemented (e.g., using a standalone touch state classifier 330) in any device equipped with a sensor capable of capturing depth data and a sensor capable of capturing image data, and does not require the use of a single sensor that captures both image and depth data (although such a sensor may be used with the method 700).

The touch state classification may be outputted to be further processed by other modules. For example, the touch state classification may be outputted by the touch state classifier 330 and the gesture detection module 300 may use the touch state classification to determine whether the gesture should be further processed. For example, if the touch state classifier 330 outputs a hovering state classification, then the gesture may not require processing. On the other hand, if the touch state classifier 330 outputs a touching state classification indicating that a touch gesture is activated, then the gesture detection module 300 may use the drag state classifier to further process the touch gesture to determine if the touch gesture is performing a drag gesture.

In the present disclosure, a drag gesture refers to a touch gesture (i.e., fingertip is detected as touching a surface) that changes location over a plurality of frames while maintaining the touching state (i.e., fingertip continues to touch the surface). A drag gesture may involve two fingertips touching a surface, in which the drag gesture is performed to define a selection area (typically a rectangular area) between the two fingertips. While such drag gestures have been implemented on devices that use touch sensors (e.g., a touchscreen) to detect the drag gesture, implementation using computer vision to detect the drag gesture has been lacking.

Further, existing computer vision-based systems typically are designed to detect and recognize gestures performed by a single user. The inability to support multi-user gestures limits the types of user interactions that can be performed.

In some examples, the present disclosure describes a method and system that enables implementation of a touch-and-drag gesture (also referred to simply as a drag gesture) in computer vision-based user interactions. In particular, the method and system enables implementation of multi-user drag gestures.

Figure 8:
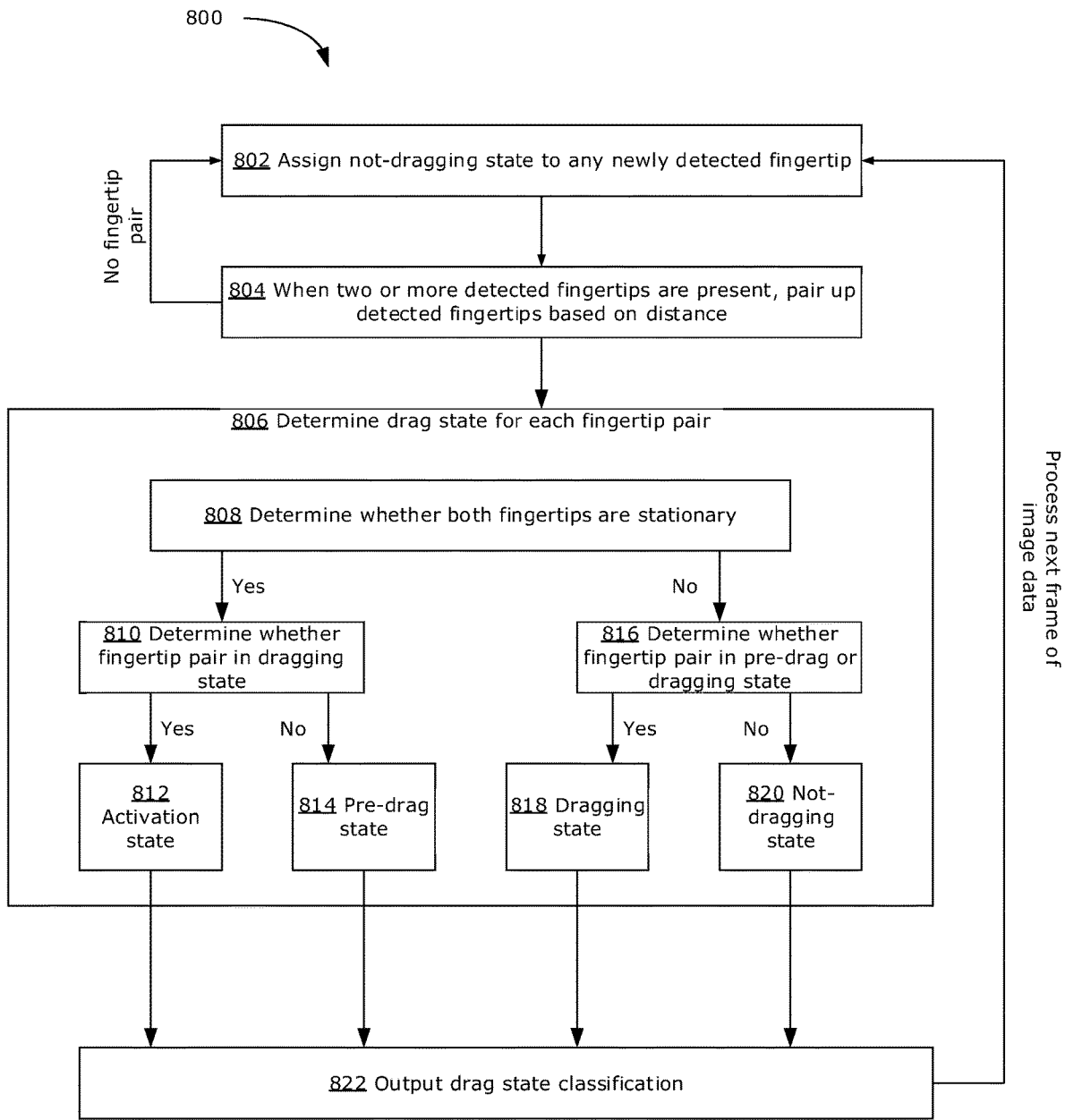
FIG. 8 is a flowchart of an example method for classifying the drag state of a detected fingertip, in accordance with examples of the present disclosure.

FIG. 8 is a flowchart illustrating an example method 800 for classifying the drag state of a detected fingertip. The method 800 may be implemented by the device 100 (e.g., by the processing unit 202 executing instructions stored in the memory 208). The method 800 may be performed using the drag state classifier 340 of the gesture detection module 300, for example.

Using the method 800, two detected fingertips may be paired together and classified to one of several possible drag states. In the present disclosure, possible drag states include a pre-drag state, in which two detected fingertips are each detected to be in touching state and are paired together at the start of a drag gesture. Another possible drag state is a dragging state, in which two paired fingertips that were previously in pre-drag state are moving (i.e., one or both of the fingertips have moved from the location at the start of the drag gesture). Another possible drag state is an activated state, in which two paired fingertips that were previously in dragging state have stopped moving. The activated state may also be considered the end of the drag gesture. Another possible drag state is a not-dragging or invalid state, in which a detected fingertip is not in any of the above states. The classification of a drag state may be performed for each pair of fingertips (i.e., a single drag state classification is generated for a pair of fingertips) or may be performed for each fingertip in the pair (i.e., a drag state classification is generated for each fingertip in the pair, with the drag state classification being the same for both fingertips in the pair). A detected fingertip that is unpaired may be classified as the not-dragging state, regardless of its touch state.

The method 800 may be performed to process each frame of image data that is received (e.g., in real-time or near real-time) by the gesture detection module 300. The method 800 may be performed continuously, as each frame of image data is received. The drag state classification for each detected fingertip (or each fingertip pair) may be outputted at every frame.

The method 800 may be performed on a frame of image data (simply referred to as an image) that is received by the gesture detection module 300 and that may have been processed by a submodule of the gesture detection module 300. The image may be a video frame that has been processed (e.g., by the hand detector 310 or other module external to the gesture detection module 300) to detect a hand (and corresponding bounding box) or that has been cropped to show a detected hand, for example. Further, the image may have been processed to detect a fingertip and to determine the location of the fingertip in the image (e.g., using a fingertip detection and tracking module). In some examples, the method 800 may be performed after a gesture in the image has been classified as a valid pointing gesture (e.g., using the method 500) and/or after a detected fingertip has been classified as being in a touching state (e.g., using the method 700).

At 802, any newly detected fingertip in the image (i.e., not detected in any previous frame of image data) is initially assigned a not-dragging state.

At 804, when there are two or more detected fingertips present in the image, the fingertips are paired up based on distance from each other. In particular, using the location of each detected fingertip (determined from earlier processing of the image, for example using a fingertip detection and tracking module), the distances between all possible pairs of fingertips are computed. Then fingertip pairs are assigned based on the shortest distance between each pair.

For example, the distances between every possible pair of fingertips may be computed, then the distances may be sorted in ascending order (with each computed distance being associated with the two fingertips that the distance is computed for). The two fingertips that have the shortest distance between their respective locations may be assigned as the first fingertip pair. In some examples, two fingertips can be assigned to a fingertip pair only if the distance between the two fingertips is within a distance threshold (e.g., within a distance of 5.0 cm). Any distances computed for any fingertip that has been assigned to a pair are removed from the list of distances. The process is then repeated to assign the second fingertip pair based on the shortest distance in the remaining list of distances, and so forth, until all fingertips have been assigned to a pair, until there is only one fingertip remaining unassigned to a pair, or until the remaining distances all exceed the distance threshold.

It should be noted that, at step 804, only those fingertips that have not previously been assigned to a fingertip pair may be considered. For example, the gesture detection module 300 may have an internal memory that tracks any previously fingertip pairs. For example, fingertips that have been previously assigned to a fingertip pair may be labeled as paired and omitted from the computation of distances. In another example, only fingertips that are not in a pre-drag or dragging state (either of these states implies the fingertip has been assigned to a fingertip pair) may be considered.

Following step 804, any fingertip that has not been assigned to a fingertip pair may remain in the not-dragging state. If, following step 804, there are no fingertip pairs (e.g., there is only one detected fingertip, or there are no fingertips within the distance threshold of any other fingertip), the method 800 may return to step 802 to process the next frame of image data.

If there is at least one fingertip pair, the method 800 process to step 806 to determine the drag state for each fingertip pair. Step 806 may be performed for each fingertip pair that has been assigned, and may be repeated until a drag state classification has been determined for each and every fingertip pair in the current frame of image data. Step 806 will now be discussed with respect to a given fingertip pair.

At 808, it is determined whether both fingertips in the given fingertip pair are stationary. A fingertip may be determined to be stationary if the detected location of the fingertip is substantially unchanged for a defined time duration (e.g., 0.6 s) or for a defined number of frames (e.g., 6 frames, which correspond to 0.6 s if frames are received at 100 ms intervals). If both fingertips are stationary, the method 800 proceeds to 810.

At 810, it is determined whether the given fingertip pair is currently in the dragging state (e.g., the given fingertip pair is in the dragging state or each fingertip in the given fingertip pair is in the dragging state). For example, the gesture detection module 300 may have an internal memory that tracks any previously assigned states.

If the given fingertip pair is currently in the dragging state, then at 812 the state of the given fingertip pair is changed to the activation state (e.g., the state of the given fingertip pair is changed to the activation state, or the state of each fingertip in the given fingertip pair is changed to the activation state). The activation state is outputted at 822 as the drag state classification for the given fingertip pair. A change from the dragging state to the activation state indicates that the given fingertip pair has been recognized as a selection gesture defining a selection region (e.g., the stationary locations of the two fingertips in the given fingertip pair may be used to define opposite corners of a selection rectangle). Optionally, feedback may be outputted to the user (e.g., an audio feedback such as a beep, or a visual feedback such as a change in color or thickness of a virtual selection rectangle displayed over a display of the image) to indicate that the given fingertip pair has been detected as having completed a selection gesture.

The activation state classification (and/or the classification as a selection gesture) and the defined selection region may be outputted to be further processed by other modules of the device 100. For example, a text recognition module may be used to perform optical character recognition on any text contained in the image within the defined selection region. In some examples, prior to performing text recognition, the defined selection region may be modified by the oriented selection region generator 350 of the gesture detection module 300, the operations of which are discussed further below.

After the given fingertip pair has been set to the activation state, any further change in location of either of the fingertips in the given fingertip pair may result in both fingertips being unassigned to the fingertip pair and both fingertips being reset to the not-dragging state. Any data in the internal memory tracking the given fingertip pair may be deleted.

Returning to step 810, if, after determining that both fingertips in the given fingertip pair are stationary, the given fingertip pair is not currently in the dragging state, then at 814 the state of the given fingertip pair is set to the pre-drag state (e.g., the state of the given fingertip pair set to the pre-drag state, or the state of each fingertip in the given fingertip pair is set to the pre-drag state). The pre-drag state means that the given fingertip pair has been stationary for at least the defined time duration or defined number of frames, but have not yet begun moving. The given fingertip pair may remain in the pre-drag state for multiple frames of image data, as long as they remain stationary. The pre-drag state classification is outputted as the drag state classification for the given fingertip pair at 822. There may not be any further processing of the image required if the pre-drag state classification is outputted. Optionally, feedback may be outputted to the user (e.g., an audio feedback such as a beep, or a visual feedback such as a virtual crosshair displayed over the locations of the fingertips in a display of the image) to indicate that the given fingertip pair has been detected as being ready to make a dragging selection.

Returning to step 808, if it is determined that not both of the fingertips of the given fingertip pair are stationary (e.g., one or both of the fingertips have changed location, relative to a previous frame of image data, by an amount greater than some noise margin), the method 800 proceeds to step 816.

At 816, it is determined whether the given fingertip pair is currently in the pre-drag state (e.g., the given fingertip pair is in the pre-drag state or each fingertip in the given fingertip pair is in the pre-drag state) or in the dragging state. For example, the gesture detection module 300 may have an internal memory that tracks any previously assigned states.

If the given fingertip pair is currently in the pre-drag state, then at 818 the state of the given fingertip pair is changed to the dragging state. If the given fingertip pair is already in the dragging state, then at 818 the state of the given fingertip pair is maintained in the dragging state. The dragging state is outputted at 822 as the drag state classification for the given fingertip pair. Optionally, feedback may be outputted to the user (e.g., an audio feedback such as a continuous series of beeps, or a visual feedback such as a virtual selection rectangle shown being dragged by the fingertips in a display of the image) to indicate that the given fingertip pair has been detected as drawing a selection rectangle.

Returning to step 816, if, after determining that not both of the fingertips are stationary, the given fingertip pair is not currently in the pre-drag state and also not in the dragging state, then at 820 the state of the given fingertip pair is set to the not-dragging state. The not-dragging state is outputted at 822 as the drag state classification for the given fingertip pair. There may not be any further processing of the image required if the not-dragging state classification is outputted.

After the drag state classifications for all fingertip pairs have been outputted at 822, the method 800 returns to step 802 to process the next frame of image data.

Figure 9:
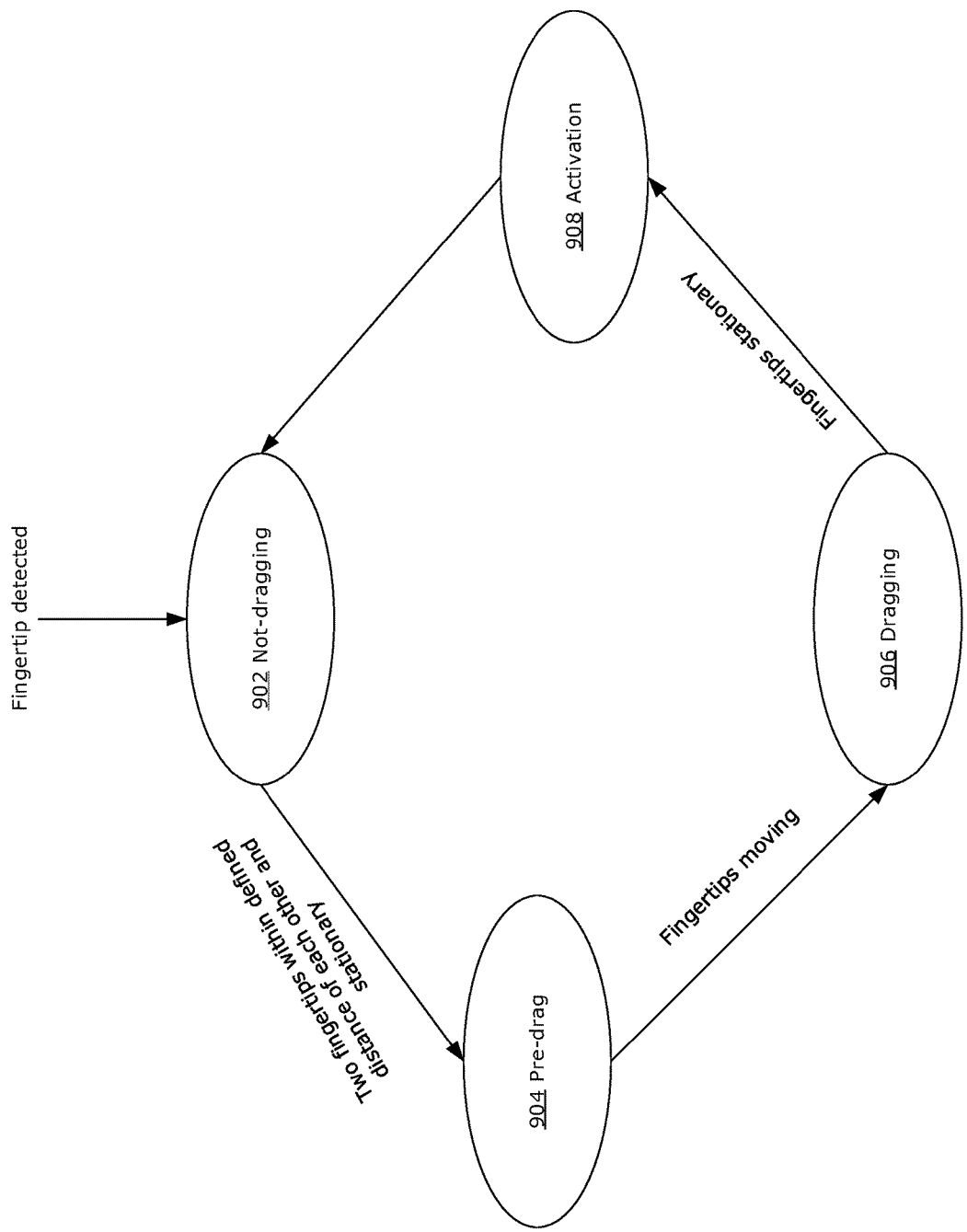
FIG. 9 is a simple state transition diagram illustrating an example of transitions between drag states, in accordance with the method of FIG. 8.

FIG. 9 is a simple state transition diagram illustrating transitions between possible drag states, in accordance with the method 800.

As shown in FIG. 9, a newly detected fingertip is initially assigned a not-dragging state 902 (e.g., at step 802 of the method 800). If it is determined that there are two detected fingertips that are within a defined distance of each other and they are stationary, and both detected fingertips are currently in the not-dragging state 902 (i.e., not already assigned to another fingertip pair), then the two detected fingertips are paired up as a fingertip pair (e.g., at step 804 of the method 800) and the state of the fingertip pair (or the state of each detected fingertip in the fingertip pair) transitions to the pre-drag state 904.

The fingertip pair remains in the pre-drag state 904 as long as both detected fingertips in the fingertip pair remain stationary (e.g., as shown in steps 810 and 814 of the method 800). If there is at least one moving fingertip in the fingertip pair, then the state of the fingertip pair (or the state of each detected fingertip in the fingertip pair) transitions to the dragging state 906 (e.g., as shown in steps 816 and 818 of the method 800).

The fingertip pair remains in the dragging state 906 as long as there is at least one fingertip in the fingertip pair that is moving. If both fingertips become stationary (for at least a defined time duration, such as 0.6 s), then the state of the fingertip pair (or the state of each detected fingertip in the fingertip pair) transitions to the activation state 908 (e.g., as shown in steps 810 and 812 of the method 800). The fingertip pair transitions from the activation state 908 back to the not-dragging state 902 after a defined time duration (e.g., after 1 s), when either fingertip moves again, or when a fingertip is removed from the captured FOV (i.e., no longer present in a frame of image data), for example. When the fingertip pair transitions from the activation state 908 to the not-dragging state 902, the fingertip pair is no longer assigned and each fingertip in the former fingertip pair may be independently assigned to a new fingertip pair (if the fingertip remains in the captured FOV).

The method 800 enables processing of multiple detected fingertips within the captured FOV. By enabling fingertip pairs to be assigned, for any number of detected fingertips in a frame of image data, multi-user interactions can be supported. Existing computer vision-based gesture detection systems typically support only single-user interactions, meaning that the presence of more than two hands performing valid gestures in the captured FOV can result in false activations (e.g., a selection region being defined between two fingers that are far apart, instead of being defined between two fingers that are close together) and sub-optimal performance (e.g., failure to recognize that a user is attempt to perform a two-handed gesture when there is a third hand in the captured FOV). Further, more than one selection region may be defined (by more than two fingertip pairs) at the same time, which may enable more user control over selection of the region(s) of interest. By supporting multi-user interactions (e.g., being able to recognize gestures performed when there are more than two hands), the method 800, when implemented by a computer vision-capable device (e.g., the device 100), a greater variety of applications and interactions are possible that would require or favor gestures performed by more than one hand.

The method 800 enables multiple users to perform drag motions, at the same time, to define respective selection regions in a captured FOV (e.g., to enable multiple users to select respective content using computer vision). The drag motion is relatively simple and intuitive gesture for most users. It should be understood that the method 800 is not limited to implementation using the gesture detection module 300 and is not limited to being implemented together with the functionality of any of the submodules shown in FIG. 3. For example, the method 800 may be implemented (e.g., using a standalone drag state classifier 340) in any current or future computer vision-capable device that supports fingertip detection.

In the example of FIG. 3, the drag state classification may be outputted to be further processed by other modules. For example, when an activation state classification is outputted, a defined selection region may also be outputted. As mentioned above, the selection region may be defined by using the stationary locations of two fingertips in a fingertip pair to define opposite corners of a selection rectangle. Conventionally, the selection rectangle may be defined using the coordinate system of the image. That is, the selection rectangle may, conventionally, be defined such that its sides are parallel to the x- and y-axes of the coordinate system of the image. However, using the coordinate system of the image to define the selection region may not match the orientation of the user performing the selection gesture. This may be particularly of concern in multi-user interactions (e.g., enabled using the method 800), in which two users who are facing in different directions may be performing selection gestures. In such a scenario, defining a selection region using the coordinate system of the image may not be reflective of the desired selection of at least one of the users.

In some examples, the present disclosure describes a method and system that defines a selection region that is oriented based on the user's orientation. In particular, a selection region can be oriented based on the direction that a user is facing. Since the user's head and face may not be visible in the captured FOV (which may capture only the user's hands), the direction of the user's hands may be used as a proxy for the direction that the user is facing.

Figure 10:
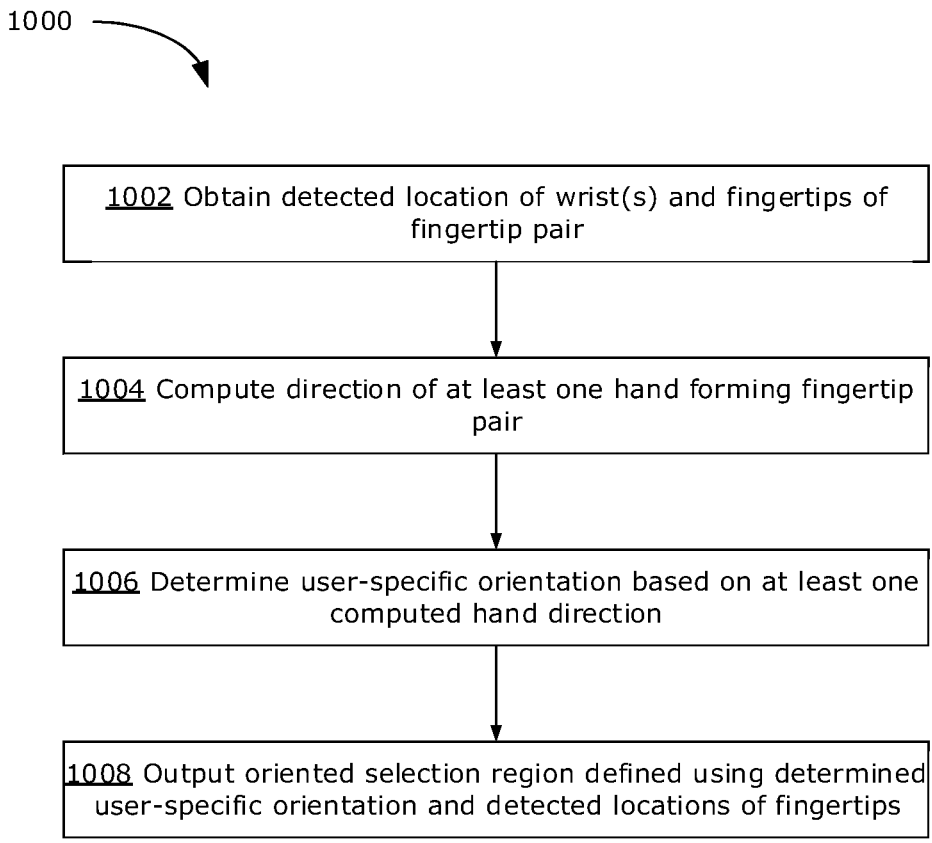
FIG. 10 is a flowchart illustrating an example method for defining an oriented selection region, in accordance with examples of the present disclosure.

FIG. 10 is a flowchart illustrating an example method 1000 for defining (or generating) an oriented selection region. The method 1000 may be implemented by the device 100 (e.g., by the processing unit 202 executing instructions stored in the memory 208). The method 800 may be performed using the oriented selection region generator 350 of the gesture detection module 300, for example.

The method 1000 may be used after to generate an oriented selection region, where a selection has been made by a user using a pair of detected fingertips. For example, using the method 800, a fingertip pair that is in the activation state may be recognized as performing a gesture to define a selection region. Accordingly, the method 1000 may be performed when there is at least one fingertip pair in a frame of image data that has been detected as performing a selection gesture (e.g., two hands performing a pointing gesture may be detected as performing a selection gesture, where the location of the pointing fingertip of each pointing hand are used to define the selection region).

At 1002, the detected locations of the fingertips in at least one fingertip pair and the detected locations of one or both wrists of the fingertip pair are obtained. In particular, the fingertip pair may be a pair of hands performing pointing gestures, and the detected locations are the detected locations of the pointing fingertip of each hand. The wrist location may be detected for at least one hand of the fingertip pair (e.g., for at least one hand whose wrist is visible within the captured FOV). For example, a keypoint detection algorithm (e.g., a hand keypoint detection model) may be trained to detect the locations of fingertips and wrists (e.g., using labeled training data). The locations of the fingertips and one or both wrists may be detected prior to performing the method 1000 (e.g., may be performed by a keypoint detection algorithm prior to the image being processed by the gesture detection module 300) or may be performed at step 1002, for example.

At 1004, the direction of at least one hand that is forming the fingertip pair is computed. A hand direction is computed for at least one hand by computing a vector from the detected wrist location of the hand to the detected fingertip location of the same hand, and the vector may be used as the hand direction. If the wrist location is detected for both hands forming the fingertip pair, then the hand directions for both hands may be computed in this way. If the wrist location is detected for only one hand of the fingertip pair, then only one hand direction may be computed for the fingertip pair.

In some examples, for any hand whose wrist is not visible in the captured FOV (and hence having no wrist location detected), the hand direction may be approximated using the direction of the pointing finger. For example, the keypoint detection algorithm may, in addition to detecting the location of fingertips and wrists of the fingertip pair, also be trained to detect the location of the knuckle and/or joints of the pointing finger. Then, a vector from the detected location of the knuckle and/or joints of the pointing finger to the detected location of the fingertip together may be computed. The computed vector may then be used as the direction of the pointing finger, which may be used to approximate the hand direction.

At 1006, a user-specific orientation is determined based on the at least one computed hand direction. If a hand direction has been computed for each hand in the fingertip pair (i.e., there are two hand directions computed) for the fingertip pair, then the user-specific orientation may be determined by extending the two hand directions until an angle is formed where the two hand directions intersect, then computing the angle bisector of the formed angle. The user-specific orientation may then be determined to be the angle bisector.

Figure 11:
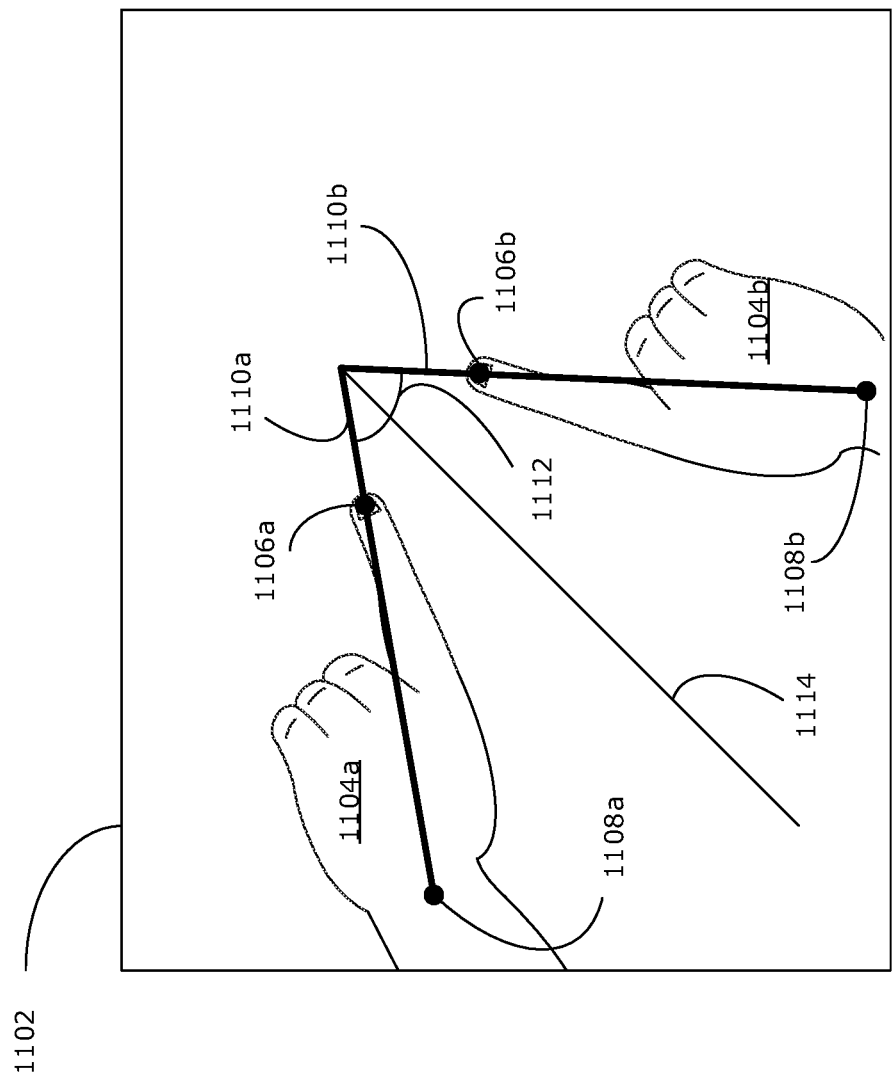
FIG. 11 illustrates an example of how the user-specific orientation may be determined, in accordance with examples of the present disclosure.

FIG. 11 illustrates an example of how the user-specific orientation may be determined when hand directions have been computed for both hands in a fingertip pair. In this example, an image 1102 is shown with two detected hands 1104a, 1104b each performing a pointing gesture. No background or other content is shown in the image 1102, for simplicity and ease of understanding.

The two hands 1104a, 1104b have been assigned to a fingertip pair. For each hand 1104a, 1104b the respective fingertip location 1106a, 1106b and wrist location 1108a, 1108b have been detected (e.g., using a trained keypoint detection algorithm). A vector from the wrist location 1108a to the fingertip location 1106a of a first hand 1104a has been computed as the first hand direction 1110a; similarly, a vector from the wrist location 1108b to the fingertip location 1106b of a second hand 1104b has been computed as the second hand direction 1110b.

The hand directions 1110a, 1110b are extended to form an angle 1112. The angle bisector 1114 of the formed angle 1112 is computed. The angle bisector 1114 is then used as the user-specific orientation for this fingertip pair.

Reference is again made to FIG. 10. At 1006, using the angle bisector between the two computed hand directions as the user-specific orientation may be effectively equivalent to normalizing the two vectors that represent the two hand directions, then computing the average of the two normalized vectors. The computed average vector may then be used as the user-specific orientation.

If a hand direction has been computed for only one hand in the fingertip pair (e.g., if the wrist of only one of the two hands in the fingertip pair is detected), then the single hand direction may be determined to be the user-specific direction.

At 1008, an oriented selection region is outputted. The oriented selection region is defined using the determined user-specific orientation and the detected locations of the fingertips in the fingertip pair. In particular, the oriented selection region is defined using the user-specific orientation to align the selection region. For example, if the selection region is a selection rectangle, then the selection rectangle is oriented such that one axis of the rectangle is perpendicular to the user-specific orientation and the other axis of the rectangle is parallel to the user-specific orientation. The detected locations of the fingertips of the fingertip pair are then used to define the opposite corners of the selection rectangle. The oriented selection region may be outputted by, for example, outputting the coordinates (according to the coordinate system of the image) of the four corners of the selection rectangle.

The oriented selection region may be outputted to be further processed by other modules. For example, the image may be cropped to the oriented selection region and the cropped image may be processed by a text recognition module or an object classification module, among other possibilities.

In this way, the oriented selection region is defined based on the user-specific orientation, rather than based on the coordinate system of the captured image. For example, it can be appreciated in FIG. 11 that the user-specific orientation, which is determined to be the angle bisector 1114, is not aligned with the x- and y-axes of the image 1102. Accordingly, an oriented selection region that is defined based on the user-specific orientation would appear to be rotated relative to the x- and y-axes of the image 1102.

Thus, the method 1000 enables generation of an oriented selection region that may be a more accurate representation of the selection that a user intended. This may enable a more user-friendly and/or more intuitive user interface, since the user would not need to be conscious of adjusting their selection to suit the coordinate system of the captured image. Generation of an oriented selection region, using the method 1000, may be toggled on or off by a user. When toggled off, the selection region may be generated that is oriented according to the coordinate system of the image (i.e., the method 1000 may not be performed).

The method 1000 may be implemented without adding significant computational cost. For example, the detection of a wrist location in addition to fingertip location may not add computational complexity to the keypoint detection algorithm, and the computation of the user-oriented direction may be relatively simple. The method 1000 may be implemented as part of the gesture detection module 300 or may be implemented separately (e.g., using a standalone oriented selection region generator 350). The method 1000 may be implemented in any computer vision-capable device that supports keypoint detection including wrist detection, for example.

Figure 12A:
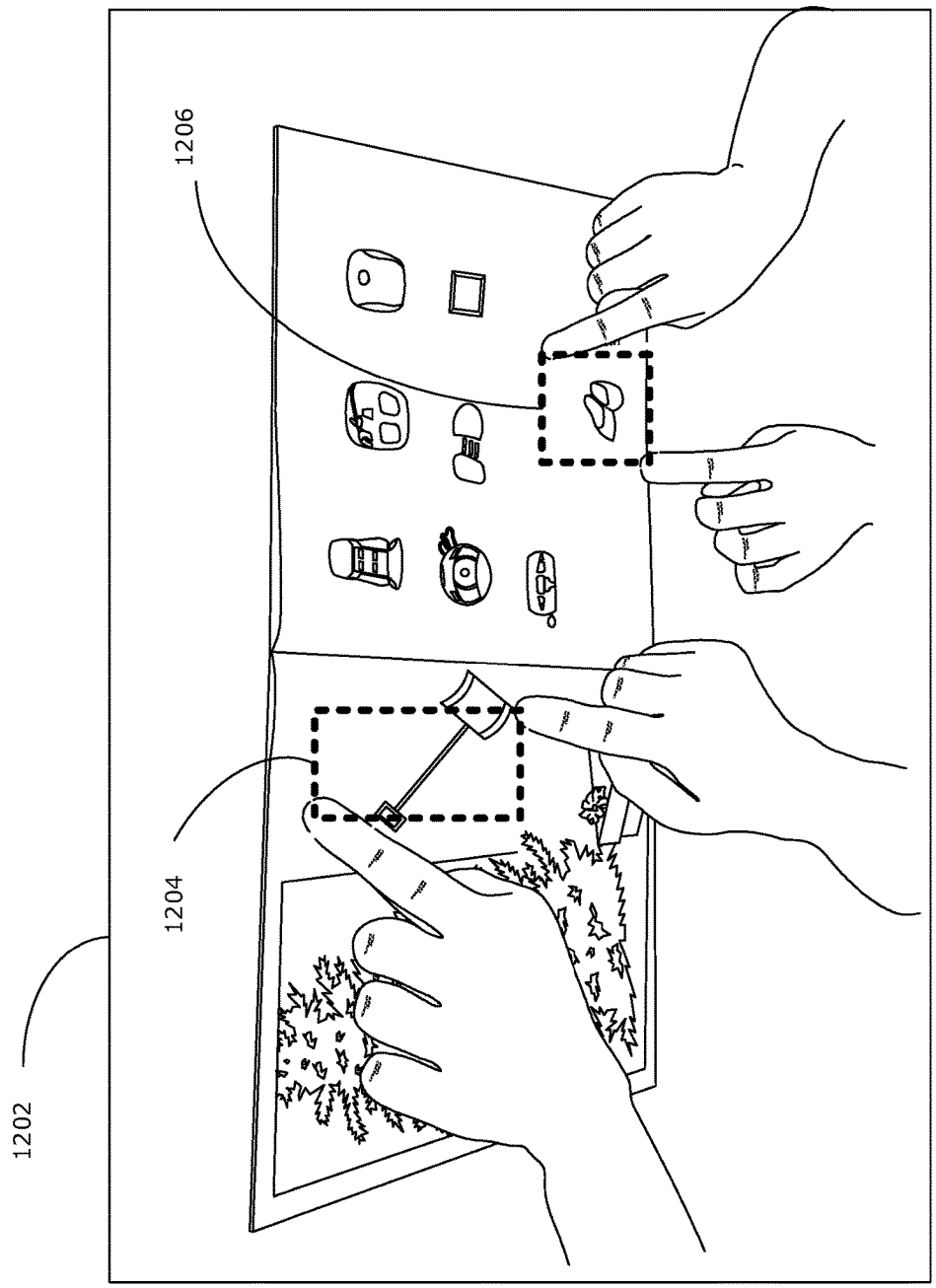
FIGS. 12A and 12B illustrate example implementations of embodiments of the present disclosure.
Figure 12B:
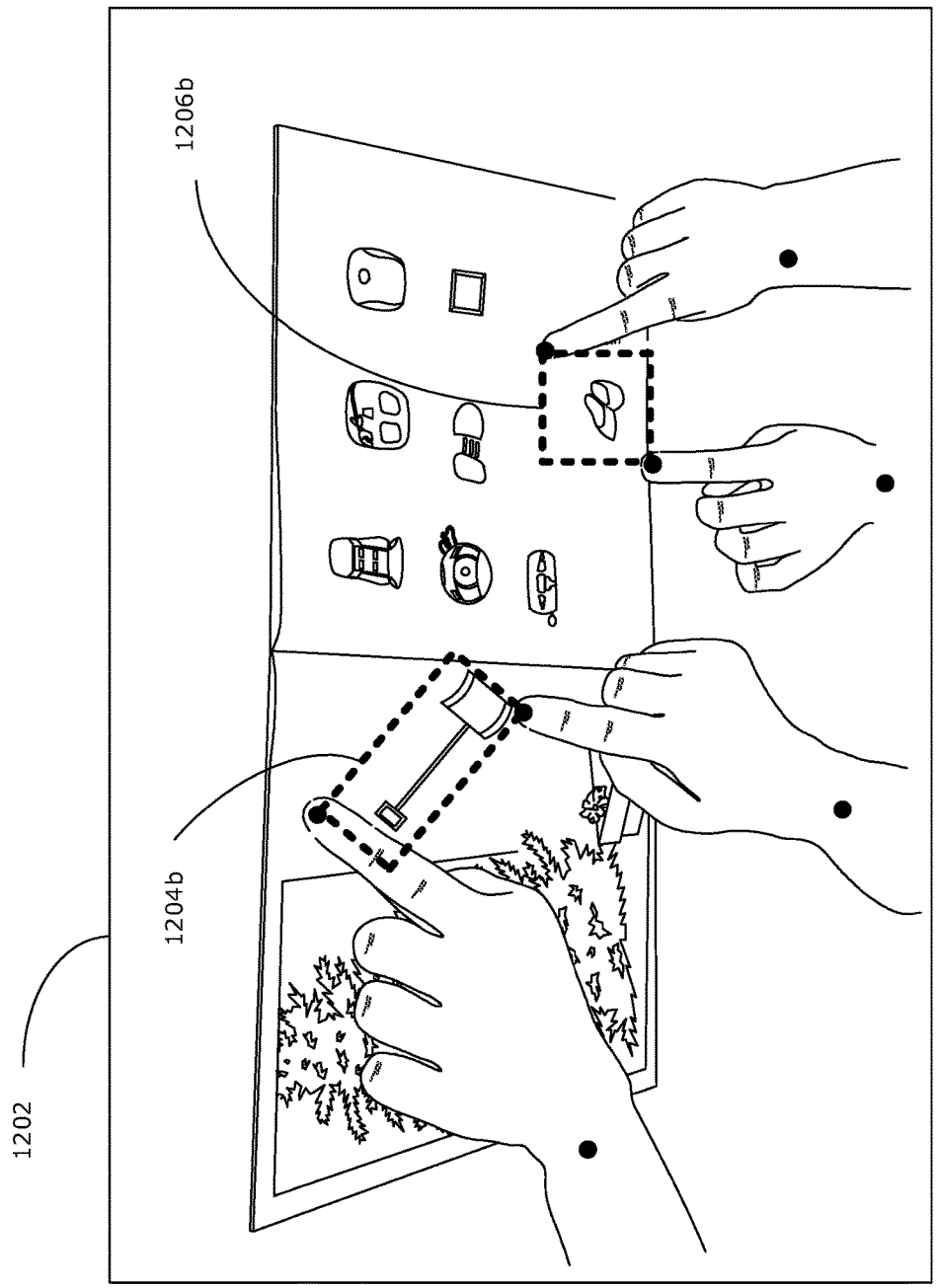

FIGS. 12A and 12B illustrate embodiments of the present disclosure in which multi-user gesture detection is supported (e.g., using the method 800). FIG. 12B further illustrates an embodiment of the present disclosure in which an orientation selection region is generated (e.g., using the method 1000). Although not explicitly shown in FIGS. 12A and 12B, gesture binary classification using decision trees (e.g., using the method 500) and/or touch state classification using depth data (e.g., using the method 700) may also be used.

In FIG. 12A, there are two users whose hands are captured in the image 1202. Each user is using both hands to perform pointing gestures. The pointing gestures are detected and recognized as being fingertip pairs performing selection gestures. Thus, there are two selection regions 1204, 1206 (indicated with virtual selection boxes displayed in the image 1202) generated in this example. As can be appreciated, both selection regions 1204, 1206 are oriented to be aligned with the coordinate system of the image 1202.

In FIG. 12B, the same two users are performing the same selection gestures. However, in this example oriented selection regions are generated. The locations of the wrists and fingertips of each pointing hand are detected (indicated with virtual black dots displayed in the image 1202) and used to determine respective user-specific orientations, as described above. As a result, the selection region 1204b for one of the users is oriented differently from the selection region 1206b for the other of the users. As can be appreciated, the oriented selection region 1204b in this example may more accurately represent the intended selection of the user (e.g., to select an image of a shovel in this example) compared to the selection region 1204 shown in FIG. 12A.

In various examples, the present disclosure has described methods and systems that enable binary classification of valid hand gestures using decision trees (e.g., instead of or to help refine classification using deep neural networks). The present disclosure has also described methods and systems for using depth data together with image data to detect a touch gesture (e.g., to avoid or reduce likelihood of false positive detection of a touch activation). The present disclosure has also described methods and systems that perform determination of drag gestures, which enable single-user as well as multi-user interactions. The present disclosure has also described methods and systems for generating a selection region that is aligned to a user-specific orientation.

The examples disclosed herein, such as in the methods 500, 700, 800 and 1000, which may be implemented using the submodules 320, 330, 340 and 350, respectively, may be implemented in any computer vision-capable device. Further, the disclosed methods and submodules may be implemented in combination (e.g., as a complete point-to-select pipeline, such as in point-to-read applications) or may be implemented independently of each other.

Examples disclosed herein may be useful in various applications, not limited to computer vision-based applications and not limited to point-to-select or point-to-read applications.

For example, the use of decision trees to perform binary classification of valid gestures (e.g., as a refinement of existing gesture classification algorithms or in place of existing gesture classification algorithms) may be used to help reduce false positive detection of any predefined hand gestures (i.e., not necessarily limited to a pointing gesture).

Examples of the present disclosure may also be used in augmented reality (AR) or virtual reality (VR) applications. For example, synchronization of depth data with image data (e.g., using the method 700) may enable gestures to be performed in 3D space, where changes in depth of the performed gestures may be recognized as gestures to select an object in an AR or VR environment.

In another example, the drag state classification, based on fingertip pairs (e.g., using the method 800) may be implemented for touch-based interfaces, to enable multi-user touch-based selection. In such an implementation, the detected location of the fingertips may be detected as the locations of touch inputs, for example. In another example, AR or VR applications may benefit from being able to support multi-user dragging gestures.

In another example, generation of oriented selection regions (e.g., using the method 1000) may be implemented for labelling objects in object detection tasks. The use of oriented selection regions may enable greater accuracy in selecting and labelling a desired object.

Although examples have been described in the context of using point gestures as user input for content selection, it should be understood that gestures that include handheld instruments (e.g., stylus, pointer instrument, pen, etc.) may also be recognized as a point gesture, where the location of the distal tip of the instrument (e.g., distal point of a stylus, pointer instrument, pen, etc.) is used as the fingertip location for identifying the selected content.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A device comprising:
   at least one processing unit coupled to a memory storing computer-executable instructions thereon, wherein the instructions, when executed by the at least one processing unit, cause the device to:
display a frame of image data;
obtain extracted locations of keypoints of a detected hand in the frame of image data;
normalize the extracted locations to obtain normalized features;
process the normalized features using a trained decision tree ensemble that comprises a plurality of trained decision trees, wherein each trained decision tree in the trained decision tree ensemble processes the normalized features and outputs a respective predicted output, and the predicted outputs outputted by the plurality of trained decision trees are combined to generate the probability of the valid gesture for the detect hand;
compare the generated probability with a defined decision threshold to generate a binary classification to classify the detected hand as a valid gesture or invalid gesture; and
after classifying the detected hand as the valid gesture, process the valid gesture as a selection input to select content in the frame of image data.

2. The device of claim 1, wherein the extracted locations are extracted locations of five fingers of the detected hand.

3. The device of claim 1, wherein the instructions cause the device to normalize the extracted locations by:
fitting the extracted locations to an ellipse;
determining a transformation to transform the ellipse to a unit circle; and
applying the determined transformation to the extracted locations, to obtain the normalized features.

4. The device of claim 1, wherein each trained decision tree is trained to process a set of normalized features as input and generate as output a predicted binary classification score, and wherein the probability of the valid gesture for the detected hand is an average of the binary classification scores generated by the plurality of trained decision trees.

5. The device of claim 1, wherein the instructions cause the device to perform the obtaining, normalizing, processing and comparing to classify two or more detected hands as each performing a valid gesture that is a pointing gesture, and wherein the instructions further cause the device to:
for a pair of detected hands assigned to a fingertip pair, obtain a detected location of a fingertip of each detected hand and a detected location of a wrist of at least one detected hand;
compute a respective at least one hand direction for the at least one detected hand using a vector from the detected location of the wrist to the detected location of the fingertip;
determine a user-specific orientation based on the at least one computed hand direction; and
output an oriented selection region defined in the frame of image data, wherein the oriented selection region is defined using the user-specific orientation and the detected locations of the fingertips of the pair of detected hands.

6. The device of claim 5, wherein a first hand direction is computed for a first hand in the pair of detected hands and a second hand direction is computed for a second hand in the pair of detected hands, and wherein the user-specific orientation is determined based on an average of the first and the second hand directions.

7. The device of claim 5, wherein the oriented selection region is defined as a selection rectangle that is aligned with the user-specific orientation and that has opposite corners defined by the detected locations of the fingertips of the pair of detected hands.

8. The device of claim 1, wherein the instructions further cause the device to:
in response to generation of the binary classification to classify the detected hand as a valid gesture that is a pointing gesture, further classify whether the valid gesture is in a touching state or a hovering state by:
synchronizing the frame of image data with a frame of depth data;
extracting a patch of depth data in a region about a detected fingertip of the pointing gesture;
computing a spread in depth values in the extracted patch of depth data; and
comparing the computed spread with defined depth threshold to generate a touch state classification classifying the valid gesture as the touching state or the hovering state.

9. The device of claim 8, wherein the frame of image data is synchronized with the frame of depth data using a circular buffer, wherein the circular buffer has a length equal to a known frame offset between received image data and received depth data.

10. The device of claim 1, wherein there is a plurality of detected hands in the frame of image data, and wherein the obtaining, normalizing, processing and comparing are performed to classify two or more of the detected hands as performing a valid gesture that is a pointing gesture, and wherein the instructions further cause the device to:
pair up at least two of the two or more detected hands as a fingertip pair; and
define, using detected locations of fingertips of the fingertip pair, a selection region in the frame of image data.

11. The device of claim 10, wherein there are at least four detected hands performing a valid gesture that is a pointing gesture, wherein there are at least two fingertip pairs, and wherein a respective selection region is defined for each of the at least two fingertip pairs.

12. The device of claim 1, wherein the instructions further cause the device to:
in response to generation of the binary classification to classify the detected hand as a valid gesture, define a selection region in the frame of image data based on the valid gesture; and
perform text recognition on the defined selection region in the frame of image data.

13. A method comprising:
displaying a frame of image data;
obtaining extracted locations of keypoints of a detected hand in the frame of image data;
normalizing the extracted locations to obtain normalized features;
processing the normalized features using a trained decision tree ensemble that comprises a plurality of trained decision trees, wherein each trained decision tree in the trained decision tree ensemble processes the normalized features and outputs a respective predicted output, and the predicted outputs outputted by the plurality of trained decision trees are combined to generate the probability of the valid gesture for the detect hand;
comparing the generated probability with a defined decision threshold to generate a binary classification to classify the detected hand as a valid gesture or invalid gesture; and after classifying the detected hand as the valid gesture, processing the valid gesture as a selection input to select content in the frame of image data.

14. The method of claim 13, wherein normalizing the extracted locations comprises:
fitting the extracted locations to an ellipse;
determining a transformation to transform the ellipse to a unit circle; and
applying the determined transformation to the extracted locations, to obtain the normalized features.

15. The method of claim 13, wherein each trained decision tree is trained to process a set of normalized features as input and generate as output a predicted binary classification score, and wherein the probability of the valid gesture for the detected hand is an average of the binary classification scores generated by the plurality of trained decision trees.

16. The method of claim 13, further comprising performing the obtaining, normalizing, processing and comparing to classify two or more detected hands as each performing a valid gesture that is a pointing gesture, and the method further comprising:
for a pair of detected hands assigned to a fingertip pair, obtaining a detected location of a fingertip of each detected hand and a detected location of a wrist of at least one detected hand;
computing a respective at least one hand direction for the at least one detected hand using a vector from the detected location of the wrist to the detected location of the fingertip;
determining a user-specific orientation based on the at least one computed hand direction; and
outputting an oriented selection region defined in the frame of image data, wherein the oriented selection region is defined using the user-specific orientation and the detected locations of the fingertips of the pair of detected hands.

17. The method of claim 16, wherein a first hand direction is computed for a first hand in the pair of detected hands and a second hand direction is computed for a second hand in the pair of detected hands, and wherein the user-specific orientation is determined based on an average of the first and the second hand directions.

18. The method of claim 16, wherein the oriented selection region is defined as a selection rectangle that is aligned with the user-specific orientation and that has opposite corners defined by the detected locations of the fingertips of the pair of detected hands.

19. The method of claim 13, further comprising:
in response to generation of the binary classification to classify the detected hand as a valid gesture that is a pointing gesture, further classifying whether the valid gesture is in a touching state or a hovering state by:
synchronizing the frame of image data with a frame of depth data;
extracting a patch of depth data in a region about a detected fingertip of the pointing gesture;
computing a spread in depth values in the extracted patch of depth data; and
comparing the computed spread with defined depth threshold to generate a touch state classification classifying the valid gesture as the touching state or the hovering state.

20. A non-transitory computer readable medium having instructions encoded thereon, wherein the instructions, when executed by at least one processing unit of a computing device, cause the computing device to:
display a frame of image data;
obtain extracted locations of keypoints of a detected hand in the frame of image data;
normalize the extracted locations to obtain normalized features;
process the normalized features using a trained decision tree ensemble that comprises a plurality of trained decision trees, wherein each trained decision tree in the trained decision tree ensemble processes the normalized features and outputs a respective predicted output, and the predicted outputs outputted by the plurality of trained decision trees are combined to generate the probability of the valid gesture for the detect hand;
compare the generated probability with a defined decision threshold to generate a binary classification to classify the detected hand as a valid gesture or invalid gesture; and
after classifying the detected hand as the valid gesture, process the valid gesture as a selection input to select content in the frame of image data.

* * * * *